(12) United States Patent
Ebisawa et al.

(10) Patent No.: US 6,406,770 B1
(45) Date of Patent: Jun. 18, 2002

(54) OPTICAL DISK AND METHOD OF MANUFACTURING OPTICAL DISK

(75) Inventors: Shoei Ebisawa, Kounosu; Daisuke Ito, Sakura; Kiyoshi Oshima, Kitaadachi-gun; Norio Tsunematsu; Keiichi Hashimoto, both of Ageo, all of (JP)

(73) Assignee: Dainippon Ink and Chemicals, Inc., Tokyo (JP)

( * ) Notice: Subject to any disclaimer, the term of this patent is extended or adjusted under 35 U.S.C. 154(b) by 0 days.

(21) Appl. No.: 09/485,851

(22) PCT Filed: Jun. 18, 1999

(86) PCT No.: PCT/JP99/03251
§ 371 (c)(1),
(2), (4) Date: Feb. 17, 2000

(87) PCT Pub. No.: WO99/66506
PCT Pub. Date: Dec. 23, 1999

(30) Foreign Application Priority Data

Dec. 26, 1997 (JP) .............................................. 9-361523
Jun. 19, 1998 (JP) ............................................ 10-173589

(51) Int. Cl.[7] .................................................. B32B 3/02
(52) U.S. Cl. ..................................... 428/64.1; 428/65.2
(58) Field of Search .............................. 428/64.1, 64.2, 428/64.4, 65.2, 913; 430/270.11, 495.1, 945

(56) References Cited

U.S. PATENT DOCUMENTS

| 5,197,060 A | 3/1993 | Yatake .................. 369/283 |
| 5,540,967 A | 7/1996 | Toide et al. ............... 428/64.4 |
| 5,779,855 A | 7/1998 | Amo et al. .............. 156/379.6 |
| 6,180,200 B1 * | 1/2001 | Ha ............................ 428/64.1 |

FOREIGN PATENT DOCUMENTS

| EP | 0 735 530 A1 | 10/1996 |
| EP | 0 814 470 A2 | 12/1997 |
| EP | 0 844 608 | 5/1998 |
| JP | 1-294245 | 11/1989 |
| JP | 9-259472 | 10/1997 |
| JP | 10-149578 | 6/1998 |
| JP | 11-66648 | 3/1999 |
| JP | 11-86344 | 3/1999 |

* cited by examiner

*Primary Examiner*—Elizabeth Evans
(74) *Attorney, Agent, or Firm*—Armstrong, Westerman & Hattori, LLP

(57) ABSTRACT

Ultraviolet rays are irradiated in a space through which a cationic ultraviolet curable composition falling from a nozzle passes before reaching a disc substrate. The cationic ultraviolet curable composition which has been irradiated with ultraviolet rays, is distributed in a ring form on the surface of the disc substrate. Another disc substrate is then superposed in this distributed surface to spread the composition by pressing or by the weight of the other disc substrate itself.

16 Claims, 8 Drawing Sheets

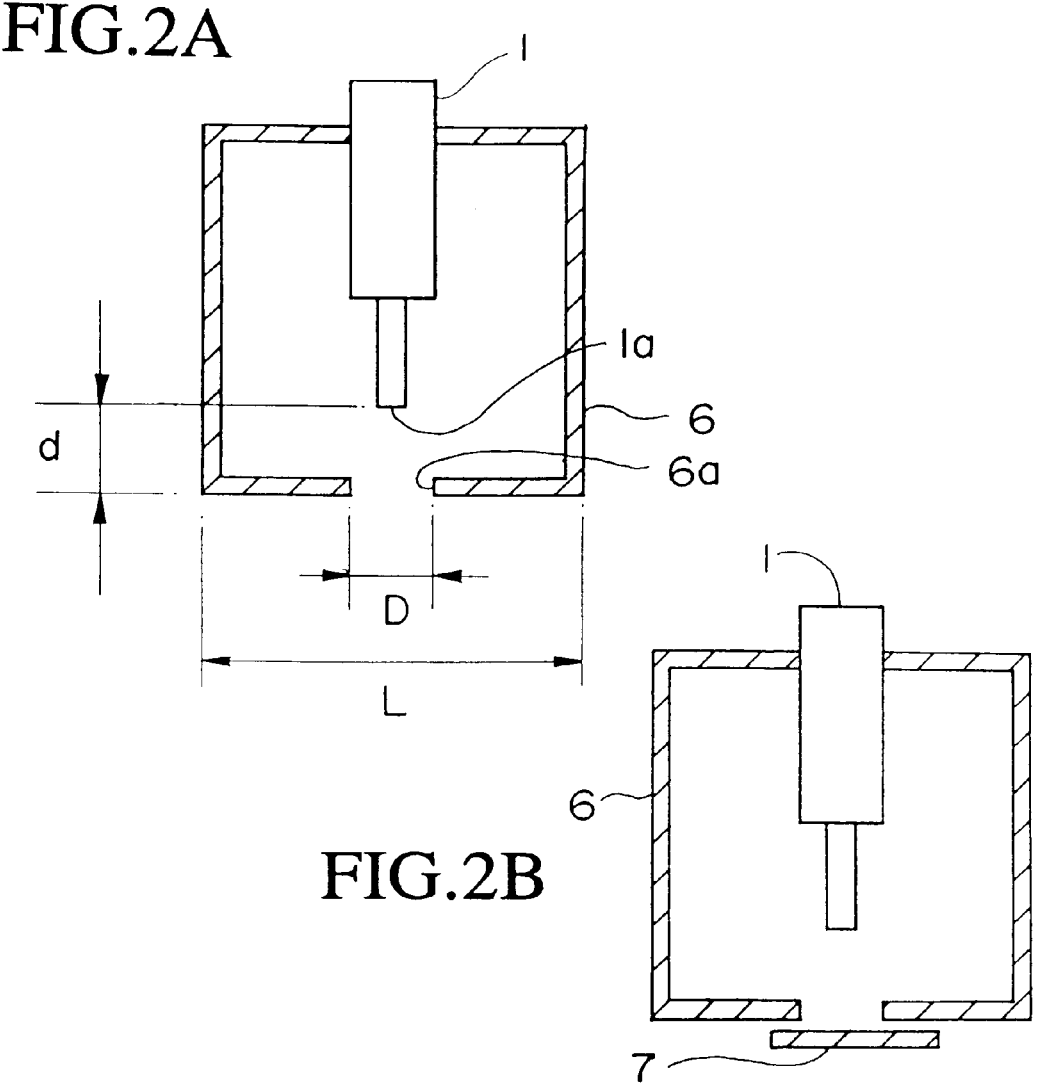
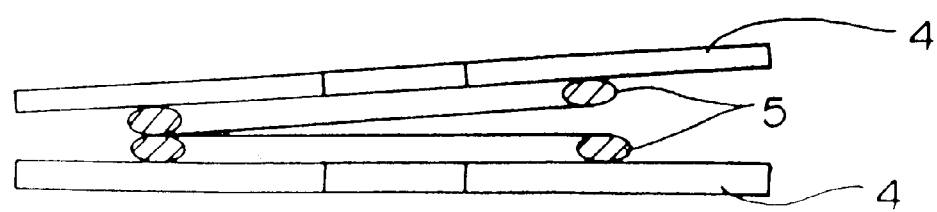

OPTICAL DISK AND METHOD OF MANUFACTURING OPTICAL DISK

TECHNICAL FIELD

The present invention relates to an optical disc represented by the digital video/versatile disc (hereinafter abbreviated as DVD) which adopts a laminating method, and a production method therefor.

BACKGROUND ART

Conventionally, when two plate-like objects are laminated using an ultraviolet curable composition as an adhesive, a radical polymerization-type ultraviolet curable composition is uniformly applied to an adhesion face by means of a spin coating method, a screen printing method, or the like which are existing techniques. After this, both adhesion faces are superposed so as to face each other, after which continuously radiative ultraviolet light is irradiated to cure the adhesive.

As a light source for the ultraviolet irradiation, a high-pressure mercury lamp, a metal halide lamp, a mercury-xenon lamp or the like have heretofore been used. With such methods, since the irradiance of the lamp is continuous, heat is easily generated, which causes a problem in that the heat may cause warping of the plate-like object, or may adversely affect the mechanical properties.

Moreover, with a continuously radiative type lamp, normally several minutes or more are necessary for the irradiance to stabilize after turning on the light. Hence turning on and off cannot be performed so often. Therefore, when a plate-like object is continually produced, the lamp must be kept turned on. If it is assumed that the time required for one adhesion (one cycle) (cycle time for the production) is 5 seconds, and of that the time required for ultraviolet irradiation is 2 seconds, then for the remaining 3 seconds energy is wastefully consumed.

When two plate-like objects are laminated using an ultraviolet curable composition as an adhesive, if at least one plate-like object of the two plate-like objects has ultraviolet transmissivity, there will be no particular problems.

With, for example, DVDs or the like produced by lamination however, there is a problem in that the ultraviolet intensity is greatly attenuated due to thin films and layers of Al and the like, before the ultraviolet rays reach the adhesive layer in which a radical polymerization type ultraviolet curable composition is used as an adhesive. Hence efficient curing and adhesion cannot be attained.

Therefore, there is a problem in that if an attempt is made to facilitate curing, lamp equipment having a large capacity becomes necessary. This inevitably leads to an increase in production costs. Moreover, when a lamp having a large capacity is used, there is a possibility of this causing problems such as deformation of the plate-like object due to the radiant heat from the lamp. To prevent this, cooling equipment around the lamp must be provided separately, which makes the whole apparatus large scale and more complicated.

On the other hand, if ultraviolet curing with lamp equipment having a small capacity is attempted, the irradiation time must be several tens of seconds or more, which is not practical.

A disc lamination method which solves the above problems is disclosed in Japanese Patent Application, First Publication No. Hei 9-193249. That is to say, the disc lamination method disclosed in Japanese Patent Application, First Publication No. Hei 9-193249 is characterized in that ultraviolet rays are not continuously radiated to a target, but are radiated in a flash. This method for radiating ultraviolet rays in a flash is a revolutionary method which enables an increase in the number of laminations per unit time compared to the case where ultraviolet rays are irradiated continuously, while suppressing the consumed power for the ultraviolet irradiation, and which is capable of preventing the generation of disc warping after lamination.

However, even this method using ultraviolet irradiation as a flash has problems as described below. That is to say, when a DVD is the laminated object, in view of the construction, ultraviolet rays will reach and cure the ultraviolet curable resin after being transmitted through an Al film having poor ultraviolet transmissivity. Hence if the Al film is thick to meet product specifications, the curing efficiency will be deteriorated. Moreover, among DVDs, in the case of the DVD-RAM where a film which does not substantially transmit ultraviolet rays (for example, $ZnS-SiO_2$ film which is typical of a dielectric film) exists, the method in which ultraviolet rays are irradiated in flashes onto an ultraviolet curable resin existing on the bonding faces of two discs to cure and bond this, cannot be adopted.

Japanese Patent Application, First Publication No. Hei 9-69239 discloses an effective lamination method with respect to the above problems. The method disclosed in Japanese Patent Application, First Publication No. Hei 9-69239 is characterized in that a slow acting cationic ultraviolet curable composition is used instead of the radical polymerization type ultraviolet curable resin being the conventional adhesive. More specifically, the cationic ultraviolet curable composition is applied to the whole surface of one disc to be laminated, and thereafter ultraviolet rays are irradiated onto the cationic ultraviolet curable composition. Then the other disc to be laminated is superposed thereon, pressure is applied thereto, and the cationic ultraviolet curable composition is allowed to cure.

The method using the cationic ultraviolet curable composition disclosed in Japanese Patent Application, First Publication No. Hei 9-69239 is an effective method, enabling adhesion even in the case where the Al film is thick, or with the DVD-RAM where the $ZnS-SiO_2$ film or the like which does not substantially transmit ultraviolet rays exists.

However, it is recognized that even with the method disclosed in Japanese Patent Application, First Publication No. Hei 9-69239, there are points to be improved. That is to say, as described above, with the method disclosed in Japanese Patent Application, First Publication No. Hei 9-69239, after the cationic ultraviolet curable composition is applied to the whole surface of one disc, the other disc is superposed thereon. At the time of superposition, there is a possibility that bubbles are trapped in large quantities, thereby deteriorating the adhesion performance.

That is to say, the resin in the vicinity of the bubbles is subject to inhibition of polymerization due to moisture (water content) contained in the bubbles, and curing may not be performed completely. Furthermore, there is a possibility that the product quality after lamination may be impaired. Moreover, if a disc in which bubbles are trapped is exposed to high temperature and high moisture for a long period of time, the inside air may expand, and in the worst case, the surface of the disc may swell.

Moreover, with the method disclosed in Japanese Patent Application, First Publication No. Hei 9-69239, two disc substrates are pressed together after being superposed. However, there is a possibility that damage may occur on the disc surface due to the mechanism used for pressing. This occurrence of damage becomes significant when the discs are produced continuously, and may lead to a decrease in product yield.

Furthermore, in view of the properties of the cationic ultraviolet curable composition, a predetermined period of time is required for curing after lamination. Therefore it is necessary to leave the disc substrate to stand for a certain period of time and to take measures so that deformation or displacement does not occur. This becomes a hindrance in constructing mass production equipment.

Moreover, there is a problem in that the cationic ultraviolet curable composition protruding from the bonding face becomes tacky, so that handling is troublesome.

Therefore, it is an object of the present invention is to provide an optical disc wherein even in the case where a cationic ultraviolet curable composition is used, trapping of bubbles in the adhesive layer is minimal, and uneven curing is suppressed. Moreover, it is another object of the present invention to provide a production method for optical discs which can efficiently produce optical discs, and which does not perform direct ultraviolet irradiation onto the surface of the disc substrate, and hence does not cause deformation of the disc substrate due to the conductive heat or radiant heat from the lamp, which has been a problem with the conventional methods.

DISCLOSURE OF THE INVENTION

The present inventors made an investigation for suppressing the trapping of bubbles even in the case where a cationic ultraviolet curable composition is used, and for preventing the occurrence of uneven curing of the adhesive layer.

As a result, the present inventors found that if ultraviolet rays were sufficiently irradiated beforehand onto a cationic ultraviolet curable composition in a liquid form, before spreading on the disc substrate, and thereafter the cationic ultraviolet curable composition was distributed and spread on at least one disc substrate of the two disc substrates, trapping of bubbles in the adhesive layer could be suppressed, and consequently, the occurrence of uneven curing could be prevented.

More preferably, it was found that if ultraviolet rays were sufficiently irradiated onto a cationic ultraviolet curable composition in a liquid form beforehand, and thereafter the cationic ultraviolet curable composition was distributed and spread on at least one disc substrate of the two disc substrates, trapping of bubbles in the adhesive layer could be further suppressed, and consequently, the occurrence of uneven curing could be prevented more effectively.

The present invention is based on the above findings, and is a production method for an optical disc characterized in that a cationic ultraviolet curable composition in a liquid form irradiated beforehand with ultraviolet rays is distributed on a first disc substrate, before superposing a second disc substrate thereon and spreading the cationic ultraviolet curable composition in a liquid form, and the second disc substrate is then superposed thereon to spread the cationic ultraviolet curable composition in a liquid form, and the cationic ultraviolet curable composition in a liquid form is allowed to cure.

More preferably, the present invention is a production method for an optical disc characterized by comprising the steps of: irradiating ultraviolet rays onto a cationic ultraviolet curable composition in a liquid form; dropping the cationic ultraviolet curable composition in a liquid form which has been irradiated with ultraviolet rays onto a first disc substrate; superposing a second disc substrate on the first disc substrate on which the cationic ultraviolet curable composition in a liquid form has been distributed; and spreading the cationic ultraviolet curable composition in a liquid form.

With the present invention, the cationic ultraviolet curable composition in a liquid form irradiated beforehand with ultraviolet rays is distributed on the first disc substrate, before superposing the second disc substrate thereon and spreading the cationic ultraviolet curable composition in a liquid form. At the time of distribution, the cationic ultraviolet curable composition in a liquid form may be dropped on the disc substrate so as to become a shape suitable for spreading. For example, this may be dripped or allowed to hang down so as to be pulled like a string.

With the method where the cationic ultraviolet curable composition in a liquid form is dropped on the disc substrate and then irradiated with ultraviolet rays, ultraviolet rays are inevitably also irradiated onto the disc substrate consisting of polycarbonate or the like, though essentially the one that requires ultraviolet irradiation before and after spreading is only the cationic ultraviolet curable composition. This unnecessary ultraviolet irradiation onto the disc substrate may cause thermal deformation in a disc substrate such as a DVD having a small thickness (a thickness of 0.6 mm), due to the heat from a lamp serving as the ultraviolet light source.

From this point of view, with the present invention, as the method of distributing the cationic ultraviolet curable composition in a liquid form irradiated beforehand with ultraviolet rays on the first disc substrate before superposing the second disc substrate thereon and spreading the cationic ultraviolet curable composition, it is desirable to adopt a method for irradiating ultraviolet rays in a space through which the cationic ultraviolet curable composition falling from the nozzle passes before reaching the first disc substrate, in order to irradiate ultraviolet rays onto the cationic ultraviolet curable composition before this falls onto the first disc substrate. For example, it can be considered to irradiate ultraviolet rays during a step for passing the cationic ultraviolet curable composition through a tube constructed from a light transmissive material. With this method however, the cationic ultraviolet curable composition becomes cured and adhered to the inner wall of the tube, making it difficult to ensure the passage of the cationic ultraviolet curable composition without replacing the tube. On the other hand, with the method for irradiating ultraviolet rays in the space, such a problem does not arise. However, the present invention does not positively exclude the method for irradiating ultraviolet rays onto the cationic ultraviolet curable composition passing through a tube constructed from a light transmissive material.

With the cationic ultraviolet curable composition in a liquid form used in the present invention, curing can be initiated by the irradiation of ultraviolet rays, and the composition can be spread approximately between the two disc substrates by superposing the two disc substrates, after which the curing is completed.

With the present invention, a cationic ultraviolet curable composition in a liquid form consisting of a cationic ultraviolet curable resin and a cation polymerization type photoinitiator is used. With the present invention, a cationic ultraviolet curable composition in a liquid form consisting of an epoxy resin as the main component and a cation polymerization type photoinitiator as the initiator is preferably used.

The aforesaid composition differs from a normal ultraviolet curable composition where the curing level reaches substantial saturation immediately upon irradiation of ultraviolet rays (referred to as "fast acting" in a sense that it cures immediately), in that the curing level does not reach saturation immediately after irradiation of ultraviolet rays but reaches substantial saturation after a predetermined time has elapsed (referred to as "slow acting"). That is to say, since there is a certain period of time (a pot life) from the time of irradiation of ultraviolet rays until the curing level reaches saturation, the lamination operation and fine adjustment can be done during that time. The cationic ultraviolet curable composition containing a cationic ultraviolet curable resin and a cation polymerization type photoinitiator as the essential components is preferably in a substantially non-solvent liquid form, in view of the ease of dropping onto the disc substrate. It is more preferable to select the composition so that the composition itself and a cured adhesive layer thereof both become transparent.

A functional property which the composition has, that curing is initiated upon irradiation of ultraviolet rays, and that with the superposition of a second disc substrate on the first disc substrate the composition can be spread approximately between the two disc substrates, and thereafter curing is completed, is more specifically a property that the composition can be spread over the whole surface where adhesion is required with the curing level of the composition not reaching saturation during spreading, that the composition does not protrude from between the disc substrates, that the composition contains as few bubbles as possible, and that the film thickness becomes uniform.

The curing level reaching saturation during spreading means that adhesion can be performed at only a part of the face where adhesion is required, leading to problems in that warping becomes worse, sufficient adhesion strength cannot be obtained, and that recording information degenerates or cannot be reproduced because of ingress of gas or liquid into a gap between the laminated discs. On the other hand, protrusion from between the disc substrates leads to problems such as over consumption of the composition, and tackiness at the edge faces.

For such functional properties, the cycle time for lamination, the ultraviolet irradiation amount onto the composition, and the ease of spreading of the composition are considered and selected so as to be optimum. When the former two conditions are fixed, the functional property depends solely upon the ease of spreading of the composition. Typically, therefore, by adjusting the viscosity of the composition, the functional property can be controlled.

In this connection, the cycle time for lamination is set to be as short as possible, for example 7 seconds or less and preferably from 1 to 5 seconds.

The viscosity of the cationic ultraviolet curable composition in a liquid form used in the present invention is set to be from 50 to 10000 mPas, preferably from 100 to 1000 mPas, normally at 25° C., though differing according to the spreading method. The composition distributed onto the disc substrate increases in viscosity and is cured after ultraviolet rays are irradiated thereon. Preferably the curing level does not reach saturation until the composition has spread sufficiently over the disc substrate.

As the cationic ultraviolet curable composition in a liquid form used in the present invention, one having a viscosity of from 200 to 450 mP·a as measured by a BM type viscometer, and an increase rate of the complex coefficient of viscosity after 3 minutes from irradiation of ultraviolet rays of not higher than 200%, for example from 200 to 10%, is preferable. Of this, one having a viscosity of from 250 to 350 mPa·s and an increase rate of the complex coefficient of viscosity of not higher than 150%, for example from 150 to 30% is more preferable. The range shown by the o mark in Tables 2 and 3 described later is preferable.

Here the viscosity measured by the BM type viscometer refers to a viscosity under an environment of 25° C. before ultraviolet rays are irradiated (hereinafter referred to as "initial viscosity"). Moreover, the complex viscosity increase rate in the present invention is defined as described below.

The complex coefficient of viscosity $\eta^*$ was measured by using a parallel disc type rheometer RS150 (produced by HAAKE Co.), with each composition sandwiched between a stainless steel disc (having a diameter of 20 mm) and a quartz glass disc so that the distance therebetween was 50 $\mu$m, and irradiating ultraviolet rays for 3 minutes from an extra-high voltage mercury lamp (SP3-250 produced by Ushio Inc. and having an intensity of 550 mW/cm$^3$), from the quartz glass disc side at a temperature of 25° C., under conditions of frequency of 1 Hz, and distortion of 5%. The increase rate of viscosity $\Delta\eta$ (%) was determined from the initial complex coefficient of viscosity $\eta_0^*$ and the complex coefficient of viscosity $\eta_1^*$ 3 minutes after initiation of ultraviolet irradiation, using the following equation:

Complex viscosity increase rate $\Delta\eta=(\eta_1^*-\eta_0^*)/\eta_0^*\times100$ To obtain such a preferable composition in a liquid form, there is for example, a method which involves adjusting the composition ratio by using together two or more kinds of cationic ultraviolet curable resins each of which has different curing properties such as curing speed.

The time from completion of ultraviolet irradiation until the curing level reaches saturation, or the absolute value of the saturated curing level, is adjusted by various kinds of cationic ultraviolet curable resins and cation polymerization type photoinitiators used together with the resins, and the weight ratios thereof. For example, the time is adjusted from 3 to 30 minutes, preferably from 5 to 25 minutes, more preferably from 5 to 15 minutes, and most preferably from 5 to 10 minutes.

For the cationic ultraviolet curable resin used for the preparation of the cationic ultraviolet curable composition in a liquid form, there is for example an epoxy resin, and a glycidyl ether type epoxy resin is mainly used. This resin normally contains impurities to which chlorine is attached, resulting from epichlorohydrin which is the raw material. It is desirable to limit the quantity of chlorine in the epoxy resin to not higher than 1% by weight in order to prevent corrosion of a metal reflection film or a recording film of the optical disc.

In preparing a cationic ultraviolet curable composition in a liquid form without using a solvent, for example it is preferable to dissolve a solid epoxy resin in a liquid epoxy resin which can dissolve the solid epoxy resin.

Moreover, as the glycidyl ether type epoxy resin, a combination of a bisphenol type epoxy resin and an aliphatic diol polyglycidyl ether is preferable, and of this, a combination of a bisphenol type epoxy resin and an aliphatic diol diglycidyl ether is preferable in the present invention for spreading the adhesive over the whole face of the substrate and for the immediate curing after spreading.

Moreover, an oxetane compound and an alicyclic epoxy compound may be used together. Furthermore, it is preferable that the cation polymerization type photoinitiator constituting the cationic ultraviolet curable composition be an onium salt composed of a cation portion and an anion portion, the cation portion being selected from a group consisting of aromatic sulfonium, aromatic iodonium, aromatic diazonium and aromatic ammonium, and the anion portion being represented by the general formula [BX4]— (where X is a phenyl group substituted by at least two fluorine atoms or a trifluoromethyl group).

The glycidyl ether type epoxy resin includes bisphenol type diglycidyl ether, novolac type epoxy resin, aliphatic polyol polyglycidyl ether and the like. Specifically, the bisphenol type diglycidyl ether includes bisphenol A or diglycidyl ether of the alkylene oxide adduct thereof, bisphenol F or diglycidyl ether of the alkylene oxide adduct thereof, hydrogenated bisphenol A or diglycidyl ether of the alkylene oxide adduct thereof, the novolac type epoxy resin includes phenol novolac type epoxy resin, o-cresol novolac type epoxy resin and diphenylolpropane novolac type epoxy resin, the aliphatic polyol polyglycidyl ether includes ethylene glycol diglycidyl ether, propylene glycol diglycidyl ether, neopentyl glycol diglycidyl ether, butanediol diglycidyl ether, hexanediol diglycidyl ether, cyclohexanedimethanol diglycidyl ether, polypropylene glycol diglycidyl ether, trimethylol propane di-/tri-glycidyl ether, pentaerythritol tri-/tetra-glycidyl ether, and sorbitol hepta-/hexa-glycidyl ether, and other epoxy resins include resorcin diglycidyl ether.

As commercially available products of these glycidyl ether type epoxy resins, Epiclon 840, 840S, 850, 850S, 860, 1050, 830, 705, 707, 720, 725, N-665 (produced by Dainippon Ink and Chemicals, Inc.) EX-201, EX-211, EX-212, EX-252, EX-321, EX-622, EX-611 (produced by Nagase Chemicals, Ltd.), SR-16H, SR-NPG, 16H-DGE low-chlorine products (produced by Sakamoto Yakuhin Kogyo Co., Ltd.) and the like are available.

Oxetane compounds include 1,4-bis[(3-ethyl-3-oxetanyl methoxy)methyl]benzene, 1,4-bis[(3-methyl-3-oxetanyl methoxy)methyl]benzene, 3-methyl-3-glycidyloxetane, 3-ethyl-3-glycidyloxetane, 3-methyl-3-hydroxymethyl oxetane, 3-ethyl-3-hydroxymethyl oxetane and the like.

As commercially available products of these oxetane compounds, MOX, XDO (produced by Toagosei Co., Ltd.) and the like are available.

Alicylclic epoxy compounds include 3,4-epoxycyclohexylmethyl-3,4-epoxycyclohexyl carboxylate, limonene diepoxide and the like. As conmmercially available products of these alicylclic epoxy compounds, Celloxide 2021, 2081, 2083, 2085, 3000 (produced by Daicel Chemical Industries, Ltd.), Cyracure UVR-6105, 6110, 6128 (produced by Union Carbide Corp.) and the like are available. Among these cationic curable compounds, a composition consisting of a combination of a bisphenol type epoxy resin and an aliphatic diol diglycidyl ether is preferable for achieving the present invention.

The cation polymerization type photoinitiator used in the present invention is a compound which initiates cation polymerization of the epoxy group upon irradiation of ultraviolet rays. As such a cation polymerization type photoinitiator, a known and common one can be used, and there can be mentioned as being preferable, for example, an onium salt in which the cation portion is aromatic sulfonium, aromatic iodonium, aromatic diazonium, aromatic ammonium or (2,4-cyclopentadiene-1-yl)[(1-methylethyl) benzene]-Fe cation, and the anion portion is $BF_4^-$, $PF_6^-$, $SbF_6^-$, or $[BX4]^-$ (where X is a phenyl group substituted by at least two fluorine atoms or a trifluoromethyl group).

Specifically, aromatic sulfonium salt includes: bis[4-(diphenylsulfonio)phenyl]sulfide bishexafluorophosphate, bis[4-(diphenylsulfonio)phenyl]sulfide bishexafluoroantimonate, bis[4-(diphenylsulfonio)phenyl]sulfide bistetrafluoroborate, bis[4-(diphenylsulfonio)phenyl]sulfide tetrakis(pentafluorophenyl)borate, diphenyl-4-(phenylthio)phenylsulfonium hexafluorophosphate, diphenyl-4-(phenylthio)phenylsulfonium hexafluoroantimonate, diphenyl-4-(phenylthio)phenylsulfonium tetrafluoroborate, diphenyl-4-(phenylthio)phenylsulfonium tetrakis(pentafluorophenyl)borate, triphenylsulfonium hexafluorophosphate, triphenylsulfonium hexafluoroantimonate, triphenylsulfonium tetrafluoroborate, triphenylsulfonium tetrakis(pentafluorophenyl)borate, bis[4-di(4-(2-hydroxyethoxy))phenylsulfonio)phenyl]sulfide bishexafluorophosphate, bis[4-di(4-(2-hydroxyethoxy))phenylsulfonio)phenyl]sulfide bishexafluoroantimonate, bis[4-di(4-(2-hydroxyethoxy))phenylsulfonio)phenyl]sulfide bistetrafluoroborate, bis[4-di(4-(2-hydroxyethoxy))phenylsulfonio)phenyl]sulfide tetrakis(pentafluorophenyl) borate and the like.

Aromatic iodonium salt includes: diphenyliodonium hexafluorophosphate, diphenyliodonium hexafluoroantimonate, diphenyliodonium hexafluoroborate, diphenyliodonium tetrakis(pentafluorophenyl)borate, bis(dodecylphenyl)iodonium hexafluorophosphate, bis(dodecylphenyl)iodonium hexafluoroantimonate, bis(dodecylphenyl)iodonium tetrafluoroborate, bis(dodecylphenyl)iodonium tetrakis(pentafluorophenyl) borate, 4-methylphenyl-4-(1-methylethyl)phenyliodonium hexafluorophosphate, 4-methylphenyl-4-(1-methylethyl) phenyliodonium hexafluoroantimonate, 4-methylphenyl-4-(1-methylethyl)phenyliodonium tetrafluoroborate, 4-methylphenyl-4-(1-methylethyl)phenyliodonium tetrakis (pentafluorophenyl)borate and the like. Aromatic diazomium salt includes: phenyldiazonium hexafluorophosphate, phenyldiazonium hexafluoroantimonate, phenyldiazonium tetrafluoroborate, phenyldiazonium tetrakis (pentafluorophenyl)borate and the like.

Aromatic ammonium salt includes: 1-benzyl-2-cyanopyridinium hexafluorophosphate, 1-benzyl-2-cyanopyridinium hexafluoroantimonate, 1-benzyl-2-cyanopyridinium tetrafluoroborate, 1-benzyl-2-cyanopyridinium tetrakis(pentafluorophenyl)borate, 1-(naphthylmethyl)-2-cyanopyridinium hexafluorophosphate, 1-(naphthylmethyl)-2-cyanopyridinium hexafluoroantimonate, 1-(naphthylmethyl)-2-cyanopyridinium tetrafluoroborate, 1-(naphthylmethyl)-2-cyanopyridinium tetrakis (pentafluorophenyl)borate and the like. As (2,4-cyclopentadiene-1-yl)[(1-methylethyl)benzene]-Fe salt, there can be mentioned (2,4-cyclopentadiene-1-yl) [(1methylethyl)benzene]-Fe (II) hexafluorophosphate, (2,4-cyclopentadiene-1-yl)[(1methylethyl)benzene]-Fe (II) hexafluoroantimonate, (2,4-cyclopentadiene-1-yl) [(1methylethyl)benzene]-Fe (II) tetrafluoroborate, (2,4-cyclopentadiene-1-yl)[(1methylethyl)benzene]-Fe (II) tetrakis(pentafluorophenyl)borate and the like.

As commercially available products of these cation polymerization type photoinitiators, for example, UVI6990, UVI6974 (produced by Union Carbide Corp.), SP-150, SP-170 (produced by Asahi Denka Kogyo K.K.), FC-508, FC-512 (produced by 3M Co.), Irgacure 261 (produced by Ciba-Geigy Co.), RHODORSIL PI2074 (produced by Rhodia Co.) and the like are available.

The above described cation polymerization type photoinitiators may be used singly or in a combination of two or more. The addition amount thereof is from 0.2 to 10 parts, and more preferably from 0.2 to 4 parts by weight as an effective component per 100 parts by weight of the ultraviolet curable composition. If the amount is less than 0.2 parts by weight, sufficient curing cannot be obtained, and if the amount is larger than 4 parts by weight, reliability over a long period of time decreases.

Moreover, in order to further improve the curability, for example a radical photopolymerization initiator such as 2-hydroxy-2-methyl-1-phenylpropane-1-on, 1-hydroxycyclohexylphenylketone, other than pyrene, perylene, 2,4-diethylthioxanthon and phenylthiazine may be used together with the above described cation polymerization type photoinitiator as a sensitizer.

Polyol, a thermoplastic resin, a leveling agent, an antioxidant, a silane coupling agent or the like can be used as required, together with the composition of the present invention.

To irradiate ultraviolet rays onto the dropped cationic ultraviolet curable composition in a liquid form, an ultraviolet irradiation device can be disposed to the side of the dropping cationic ultraviolet curable composition, and as a light source for the ultraviolet irradiation, for example, any known lamp such as a xenon lamp, a xenon-mercury lamp, a metal halide lamp or the like may be used.

To irradiate ultraviolet rays more uniformly onto the dropping cationic ultraviolet curable composition in a liquid form, the diameter of a nozzle may be made small to thereby make the liquid drop of the cationic ultraviolet curable composition or the diameter of the dropping liquid small. A plurality of nozzles may be used, and in that case, adjustment of the dropped quantity of the cationic ultraviolet curable composition (distributed quantity of the composition on the disc substrate) becomes easy. Moreover, it is effective to irradiate ultraviolet rays from around the whole periphery of the dropping cationic ultraviolet curable composition. As a specific means for irradiating ultraviolet rays from around the whole periphery of the dropping cationic ultraviolet curable composition, it can be considered to irradiate ultraviolet rays by arranging a plurality of ultraviolet irradiation devices around the periphery of the dropping cationic ultraviolet curable composition. However, if the periphery of the dropping cationic ultraviolet curable composition is surrounded by a reflector plate, and the ultraviolet rays are irradiated onto the interior surrounded by the reflector plate, it is not necessary to arrange a plurality of ultraviolet irradiation devices. Hence energy saving and space saving become possible and this is advantageous in view of the cost.

When the ultraviolet rays are irradiated onto the dropping cationic ultraviolet curable composition, if the ultraviolet rays are irradiated to the nozzle aperture, the cationic ultraviolet curable composition is cured in the nozzle aperture, and complications such as the dropping quantity decreasing or the nozzle aperture blocking occur. To prevent this, it is preferred to drop the cationic ultraviolet curable composition in a liquid form and distribute this on the disc substrate, with the ultraviolet irradiation shut off to the periphery of the nozzle tip. As a means for shutting off the ultraviolet rays, in the present invention it is particularly preferable to protect the nozzle aperture with an ultraviolet irradiation protection cover. It is not absolutely necessary for this ultraviolet irradiation protection cover to cover the entire periphery of the nozzle aperture, and the shape is optional so long as it can achieve the object of protecting the nozzle aperture from the ultraviolet rays. Similarly, it is also particularly preferable to shut off the ultraviolet irradiation to the nozzle aperture by covering the ultraviolet irradiation device with a cover having a shutter, and opening/closing the shutter with dropping of the composition.

The quantity of the ultraviolet irradiation onto the cationic ultraviolet curable composition during dropping of the composition from the nozzle to the disc substrate is normally from 50 to 500 mJ/cm$^2$, and preferably from 100 to 400 mJ/cm$^2$.

With the present invention, since continuous ultraviolet irradiation directly onto the disc substrate is not performed, deformation due to heat does not occur even if the disc substrate does not have heat resistance. That is to say, this is advantageous compared to the conventional method in which ultraviolet rays are directly irradiated continuously onto the disc substrate.

In the case where a method for irradiating ultraviolet rays onto the cationic ultraviolet curable composition dropping from the nozzle is adopted, for example a method is preferable wherein after distributing the cationic ultraviolet curable composition in a liquid form which has been irradiated with ultraviolet rays, on the surface of at least one disc substrate in a ring form, the other disc substrate is superposed thereon to spread the cationic ultraviolet curable composition by pressing or by the weight of the other disc substrate itself.

To distribute the composition on the disc substrate in this manner, if the cationic ultraviolet curable composition is dropped while the first disc substrate is being rotated, the composition can be distributed in a ring form. After having distributed the cationic ultraviolet curable composition in a ring form, the second disc substrate is superposed thereon. If this superposed body is left alone, the ring-shaped cationic ultraviolet curable composition is spread by means of the inherent weight of the disc substrate located on top, or by pressing with a suitable load, so as to extend over the whole face between the two disc substrates. Moreover, after superposition, spreading may be performed by using a conventionally known spin coat method.

When two disc substrates are superposed, the distance between the two disc substrates is brought closer to a desired distance, with the face where the cationic ultraviolet curable composition is distributed as a bonding face.

The present invention uses a cationic ultraviolet curable composition in a liquid form which has been subjected to sufficient irradiation of ultraviolet rays. Hence the ultraviolet curable composition can be distributed in a ring form on the disc substrate. Therefore, the number of trapped bubbles can be greatly reduced, compared to the conventional method in which after the cationic ultraviolet curable composition has been applied over the whole face of the disc substrate, the two disc substrates are superposed.

To enhance the effect of preventing the bubbles from being trapped, it is recommended that the two disc substrates are not superposed in parallel from the initial stage, but are superposed in a non-parallel state, that is, in the state with one disc substrate inclined to the other disc substrate. Thereafter, the two disc substrates are brought into the parallel state (hereinafter this method is referred to as a "2P method"). Moreover, it is preferable to only press with the inherent weight of one disc substrate or with a suitable load. Furthermore, it is desired that the process for bringing the two disc substrates into parallel is controlled so that they approach each other at a speed in the order of micron per second, and that the approach be performed intermittently. According to this method, the adhesive does not disperse to the outer periphery of the disc substrate as with the spin coat method. Hence this is advantageous from the viewpoint of resources.

To prevent the generation of bubbles, it can be considered to adopt the spin coat method or the 2P method. In the case of the spin coat method however, with the cationic ultraviolet curable composition in a liquid form, for example dropped and distributed in ring form, the portion which does not form a bonding layer but is flung out to the outside is redundantly distributed on the disc substrate. As a result, compared to the 2P method in which spreading is performed only by the inherent weight or by pressing with a suitable load, the ring thickness is thicker, and due to the requirement that the ultraviolet rays are irradiated and reach to the interior thereof, it necessary to irradiate a larger quantity of ultraviolet rays. Moreover, since the flung out composition is cured in a predetermined time, it is necessary to properly remove any cured product built up in the apparatus, which is not desirable.

Though the whole thickness of the adhesive layer of the cationic ultraviolet curable composition (after curing) consisting of the cationic ultraviolet curable resin and the cation polymerization type photoinitiator is not particularly limited, it is preferable that the thickness be normally from 15 to 60 µm, and more preferably from 20 to 55 µm.

The cationic ultraviolet curable composition in the vicinity of the edge face of the optical disc is subjected to inhibition of polymerization due to moisture contained in the air. Therefore, even if an optimized composition is used, there is a possibility of slight protrusions from the bonded face between the two disc substrates because of lamination. The protruding composition is difficult to cure, causing tackiness for example. Therefore, the composition on the edge face of the optical disc is radiated with heat or light from a heat source or a light source so that the laminated discs are not warped, to age the composition, enabling promotion of curing and making this tackfree. By further irradiating ultraviolet rays onto the edge face of the optical disc, it is possible to cure the cationic ultraviolet curable composition in the vicinity of the edge face of the optical disc. When ultraviolet rays are irradiated concentrating on the edge face, adverse effects due to the heat from the lamp source to the disc substrate are not a significant problem.

Even in the case where the cationic ultraviolet curable composition protrudes at the edge face of the optical disc, this is cured at an early stage because of aging with the ultraviolet irradiation, thereby solving problems such as tackiness and the like, and preventing displacement at the time of transport. Hence, processing time can be reduced.

The ultraviolet irradiation onto the edge face may be performed continuously or in a flash. Irradiation in a flash is preferable because it is advantageous in view of energy.

The flash of ultraviolet rays may be once or more than once. When the ultraviolet rays are irradiated in a flash, for example a light emitting apparatus including an ultraviolet light source lamp and a flash-type discharge mechanism may be used.

The ultraviolet light source used in the present invention includes one which can emit light in a flash and repeatedly. As the lamp, for example various types of lamps can be used such as a xenon lamp, a xenon-mercury lamp and a metal halide lamp. However, it is preferable to use one with excellent durability and which can endure repeated light emission.

As the flash-type discharge mechanism for emitting light from the lamp in a flash, for example there can be used a circuit which connects in series a capacitor for accumulating electric charge, a coil for controlling the current waveform at the time of discharge, and an electrode for the lamp.

As the means for charging the capacitor, for example there can be used a circuit which connects in parallel with the capacitor, an element which connects in series a direct-current voltage power supply and a resistance for controlling the charge current. As a means for signaling discharge of the charge accumulated in the capacitor to the lamp, for example there can be mentioned a method in which an auxiliary electrode is provided in wire form wound several times around the lamp, and a high-voltage pulse is applied between the auxiliary electrode and one of the electrodes of the lamp by, for example a trigger generation circuit.

In this manner, the gas enclosed inside the lamp suffers a momentary collapse in the insulation due to application of the high voltage pulse, triggering the discharge of electric energy accumulated in the capacitor into the lamp all at once during a very short period of time t, and at this time, a powerful flash is emitted.

Since the electric energy is discharged in a very short period of time, of the order of a micro second to a millisecond, the voltage between both electrodes of the lamp abruptly. drops upon initiation of discharge, and the discharge itself terminates instantly.

Moreover, as the aforesaid mechanism for when the lamp is repeatedly made to emit light in a flash, for example there can be mentioned the ones described below. With the discharge accompanying the flash, charging is initiated from the direct-current voltage power supply to the capacitor, at approximately the same time as with the initiation of discharge. The time required for charging is related to a time constant τ determined by the product of the capacity of the capacitor (farads) and the resistance for controlling the charge current (ohms). In general, when the relation between the time constant τ and the discharge time t is τ>>t, the emission of light by means of discharge is not performed continuously but is finished as a single shot. However, the charging thereafter also is performed continuously.

When the charge accumulation in the capacitor saturates to some extent reaching a level where the second discharge becomes possible, if the high voltage pulse is again applied, the second flash is emitted. The repeated emission of flashes can be performed by repeating the above described operation.

When ultraviolet rays are irradiated in a flash, if infrared rays are contained in the light from the light source, it is preferable to shut off the infrared rays and irradiate only the ultraviolet rays. In this manner, the infrared rays can be prevented from being irradiated onto the disc substrate, so that warping or distortion of the optical disc itself is unlikely to occur due to heat, and transformation of recorded information is less likely to occur.

When infrared rays are selectively shut off from the light emitted from the light source lamp for emitting ultraviolet rays which contains infrared rays, generally an infrared ray-shut off filter can be used.

According to the findings of the present inventors, it was found that even if the discharged energy per one time was the same, if the peak value and the time width of the discharge current was changed, the intensity and the spectrum distribution of the light discharged from the lamp was changed, and the curability of ultraviolet curable compositions having the same composition was changed.

In order to promote curing of the cationic ultraviolet curable composition protruding at the edge face, other than ultraviolet irradiation described above, a method for heating the all composition to a temperature of from 40 to 70° C. is effective.

According to the production method of the present invention described above, a suitable optical disc can be produced, wherein the number of bubbles contained in the adhesive layer of the optical disc is from 0 to 5, preferably from 0 to 1 per 1 cm$^2$. With the optimal optical disc of the present invention, bubbles of from 0.1 to 2.0 mm do not exist substantially in the adhesive layer. Even assuming that 1 to 5 bubbles exist per 1 cm$^2$, the diameter of the bubbles is preferably in a range of from 0.1 to 2.0 mm. Moreover, it is preferred that bubbles exceeding 2.0 mm are not included.

As for the number of bubbles in the adhesive layer in the optical disc of the present invention, the diameter of bubbles and number of bubbles can be specified by visual inspection, for example by viewing with the eye or by a micrograph, and in the case where direct visual inspection is not possible, by visual inspection by exposing the adhesive layer by peeling or the like, or by scanning over the whole face of the adhesive with an ultrasonic flaw detector, without performing peeling. With the present invention, it is desirable to adopt the ultrasonic flaw detection from the viewpoint that the number of bubbles in the adhesive layer can be specified without breaking the optical disc.

With the present invention, the most preferable form of the production method is a production method for an optical disc comprising the steps of: distributing a cationic ultraviolet curable composition in a liquid form having a viscosity of from 200 to 450 mPa·s as measured by a BM type viscometer, and an increase rate of the complex coefficient of viscosity after 3 minutes from irradiation of ultraviolet rays of not higher than 200%, in a ring form on a recording layer of at least one disc substrate of two disc substrates having recording layers, while irradiating ultraviolet rays thereto; obtaining a disc by superposing the two disc substrates so that the recording layers thereof face each other; and spreading the cationic ultraviolet curable composition by pressing or by means of the inherent weight of one of the disc substrates.

The disc substrate which is the object of the present invention is constituted by a material which barely transmits ultraviolet rays or does not substantially transmit ultraviolet rays. However, there is a case where the disc substrate is not constituted by a single material, but is constituted by a complex material obtained from a material which sufficiently transmits ultraviolet rays and a material which barely transmits ultraviolet rays or does not substantially transmit ultraviolet rays. With the present invention, either of a DVD-ROM or a DVD-RAM can be produced, but there is an ideal layer construction for the production method of the present invention, attributable to the layer construction. As one example thereof, there can be mentioned a DVD-10 or DVD-18 of the DVD-ROM in which the metal film such as the aforesaid Al is thick, or a DVD-RAM.

With the DVD-10 there is known a construction where two disc substrates are prepared with undulations corresponding to recorded information provided on a transparent resin substrate having ultraviolet ray transmissivity (e.g. a polycarbonate substrate), and a light reflective layer (e.g. an Al alloy layer) laminated over the undulations, and as required a protective layer laminated over the light reflective layer, and these are cured and laminated using an adhesive with the protective layers facing each other.

In the case of the DVD-RAM, at least one of the two disc substrates is a disc substrate having an information recording layer on an ultraviolet ray transmissive substrate (a first disc substrate), and the other disc substrate (a second disc substrate) may or may not have an information recording layer. That is to say, with respect to the disc which is the object of the present invention, there is a case where the two disc substrates both have the information recording layer or a case where only one disc substrate has the information recording layer. In either case, the disc substrate normally has a thickness of from 0.3 to 1 mm.

When the optical discs of the present invention are laminated using a cationic ultraviolet curable composition in a liquid form, it is preferable to laminate two disc substrates via an adhesive layer, with at least one of the disc substrates having a film layer which does not transmit ultraviolet rays.

As the first and the second disc substrates, any known and commonly used transparent resin substrate may be used. For example, there can be mentioned a heat-resistant thermoplastic synthetic resin such as acrylic, polycarbonate and amorphous polyolefin resins. These resins are used as the ultraviolet transmissive substrate. The information recording layer is constructed such that undulations corresponding to recorded information are provided on one side of the substrate, and a metal film is laminated thereon.

The optical disc of the present invention is preferably an optical disc (DVD-RAM) comprising one disc substrate including a transparent resin layer, a recording layer corresponding to a phase change layer, and a reflective film layer as the ultraviolet non-transmissive film layer, as the essential components, and further including dielectric film layers on the opposite outer sides of the recording layer. Moreover, the disc also comprises an adhesive layer and an other disc substrate comprising a disc substrate as aforesaid or a transparent resin substrate. Of these, when the two disc substrates to be laminated both have the ultraviolet non-transmissive film layer, the cationic ultraviolet curable composition in a liquid form used in the present invention most shows its true value. Moreover, in this case, there is an optical disc where one of the ultraviolet non-transmissive film layers is the information recording layer.

In the present invention, it is possible to distribute and spread the cationic ultraviolet curable composition directly on a metal film represented by a semi-reflective film or a reflective film. Alternatively, it is possible to spread and cure on the previously mentioned metal film, a conventional ultraviolet curable resin which has been adjusted so as to prevent as far as possible degeneration of the metal film with lapse of time, and then distribute, spread and cure the cationic ultraviolet curable composition on the protective layer comprising the cured product. This protective layer preferably has a thickness as a whole of from 5 to 20 $\mu$m. In this case, both protective layers of both the first and second disc substrates are bonded by the cationic ultraviolet curable composition.

As the cationic ultraviolet curable composition in a liquid form contains a higher content of chlorine, it is preferable to provide a protective layer in this manner in order to reduce any adverse effect on the metal film.

As the metal film, one adopted for reading recorded information, which can reflect visible rays to a high degree and for which the aforesaid undulations can be accurately verified is preferable. A film reflecting visible rays to a high degree generally also reflects ultraviolet rays to a high degree.

As the metal film, for example there can be mentioned Al, Ni and alloys thereof, which satisfy conditions for the reflectance of visible rays of from 80 to 100%, and the transmittance of ultraviolet rays over the whole wavelength range thereof of more than 0 and less than 10%, and preferably more than 0 and less than 0.5%. Moreover, with standard discs referred to as DVD-9 and DVD-18, the film is formed from a material called a semi-reflective film having a light transmittance of from 70 to 82%, for example a film comprising gold.

The DVD-RAM has a characteristic layer construction differing from the above described DVD. As one example thereof, there is known one having a structure such that two disc substrates are prepared by sequentially laminating a dielectric film layer (e.g. a $ZnS$—$SiO_2$ layer), a phase change layer corresponding to a recording layer (e.g. a GeSbTe layer), a dielectric film layer (e.g. a $ZnS$—$SiO_2$ layer), a light reflective layer (e.g., an Al alloy layer), and a protective layer (a radical polymerizable ultraviolet curable resin or a cation polymerizable ultraviolet curable resin) on a transparent resin substrate having ultraviolet transmissivity (e.g. a polycarbonate substrate). The two disc substrates are then cured and laminated by an adhesive with the protective layers facing each other.

BRIEF DESCRIPTION OF DRAWINGS

FIG. 2 is an enlarged diagram of a nozzle 1 and an ultraviolet irradiation protection cover 6.

FIG. 3 is a schematic diagram showing a state during lamination of two disc substrates.

BEST MODE FOR CARRYING OUT THE INVENTION

An embodiment of the present invention will now be described in detail with reference to the accompanying drawings.

EXAMPLE 1

Two disc substrates for a DVD were prepared by forming an Al film having a thickness of 80 nm on a polycarbonate substrate having an outer diameter of 120 mim and an inner diameter of 36 mm, and laminated by a cationic ultraviolet curable composition.

Figure 1:
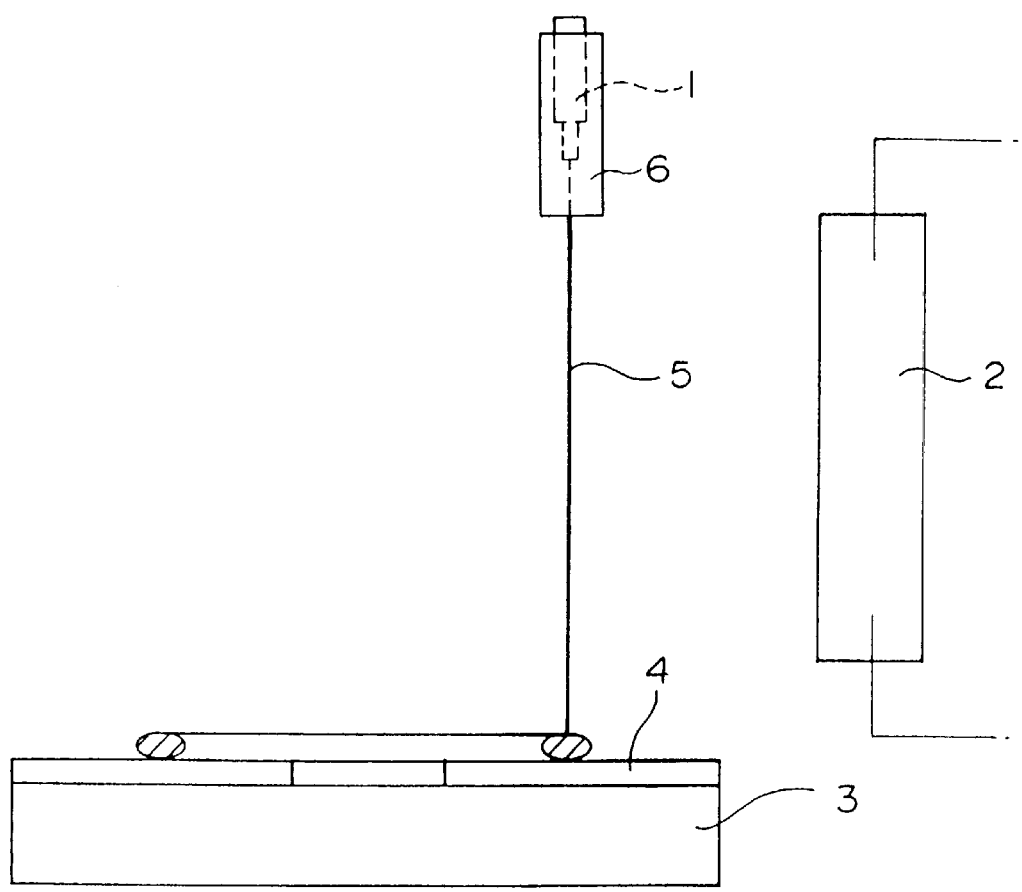
FIG. 1 is a schematic structural diagram of an apparatus used for dropping a cationic ultraviolet curable composition onto a disc substrate.

An apparatus shown in FIG. 1 and FIG. 2 was used for dropping the cationic ultraviolet curable composition onto the disc substrate.

As a dispenser (nozzle) 1, a model 1500DV (nozzle inner diameter of 0.26 mm) produced by EFD Co. in the U.S.A. was used. As an ultraviolet irradiation device 2, a metal halide lamp M03-L31 produced by Iwasaki Electric Co., Ltd., was used, under conditions that the output was 3 kW, the arc length was 25 cm, and the input energy to the lamp was 120 w/cm. Moreover, a table 3 was rotatable by a motor (not shown). The distance between the ultraviolet irradiation device 2 and the cationic ultraviolet curable composition was 50 mm, and the periphery of the ultraviolet irradiation device and the dropping cationic ultraviolet curable composition was surrounded by a reflector plate (not shown), to thereby improve the uniformity of the ultraviolet irradiation.

As the cationic ultraviolet curable composition, a resin having a viscosity of 230 mPas (25° C.) and having a mixing composition described below was used. The quantity of chlorine in this composition was less than 1% by weight.
Epoxy resin:
   EX314 produced by Nagase Chemicals, Ltd . . . 70 parts
   EX622 produced by Nagase Chemicals, Ltd . . . 30 parts
      Cation polymerization type photopolymerization initiator:
   UVI6990 produced by Union Carbide Corp . . . 2 parts After a disc substrate 4 was placed on the table 3 of the apparatus shown in FIG. 1, the above described cationic ultraviolet curable composition was distributed in a ring form on the disc substrate 4, while rotating the table 3. The discharge pressure from the dispenser 1 was adjusted so that the dropped quantity (distributed quantity) of the ultraviolet curable composition was 0.27 g per one disc substrate and the average thickness after application was 50 µm. The dropped position was an 80 mm diameter position on the disc substrate 4. This was a position where the spreading distance of the cationic ultraviolet curable composition to the inner diameter side and to the outer diameter side of the disc substrate 4 became the same.

While dropping the cationic ultraviolet curable composition 5, the light was emitted from the ultraviolet irradiation device 2 under the above described conditions, to thereby irradiate ultraviolet rays onto the cationic ultraviolet curable composition.

As described above, two disc substrates on which the cationic ultraviolet curable composition was distributed were prepared, and after positioning the faces where the cationic ultraviolet curable compositions were distributed in a ring form to face each other, the two disc substrates were superposed. At the time of superposition, bubbles tended to be trapped in the cationic ultraviolet curable composition. However, trapping of bubbles could be prevented by superposing the disc substrates in such a manner that the contact area of both resins gradually increased.

Therefore, with this embodiment, as the concept shown in FIG. 3, the cationic ultraviolet curable compositions were brought into contact with each other in a state that one disc substrate was inclined to the other disc substrate, and thereafter, the upper disc substrate was lowered so that the disc substrates became parallel, to thereby gradually bring the resins into contact with each other over the whole surface and spread the resins. By adjusting the lowering speed of the upper disc substrate, trapping of bubbles could be reduced to almost zero.

Figure 4:
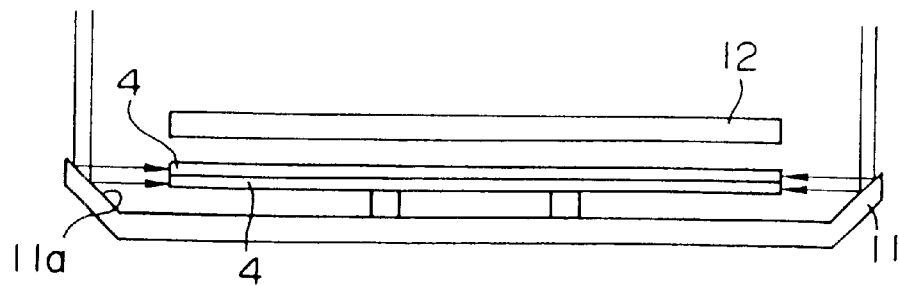
FIG. 4 is a schematic structural diagram showing one example of a method for irradiating ultraviolet rays onto an edge face of an optical disc.

After having spread the cationic ultraviolet curable composition, the two disc substrates were mounted on a tray 11 as shown in FIG. 4, and ultraviolet rays of 600 mJ/cm$^2$ were irradiated from the top. In FIG. 4, a reflective film 11a for reflecting ultraviolet rays is provided on the surface of the tray 11, and a shield plate 12 is provided above the disc substrate 4. Therefore, ultraviolet rays irradiated from above are concentrated on the edge face of the laminated disc substrates 4, as shown by the arrows in FIG. 4. The cationic ultraviolet curable composition tends to undergo curing inhibition due to the moisture contained in the air, and curing in the portion in contact with the moisture in the air is delayed, and in some cases, cannot be cured and remains in a tacky state. Hence, as in this embodiment, irradiation of ultraviolet rays to the edge faces is very effective.

After 10 minutes, the cationic ultraviolet curable composition between the disc substrates was gelled so that the two disc substrates were not easily peeled. However, the edge face portions were still in a slightly tacky state.

After 20 minutes, curing had progressed even at the edge faces, and the disc substrates were in a tackfree state. When the two disc substrates were peeled to observe the curing and bonding state of the cationic ultraviolet curable composition, the whole face was uniformly cured, and any uncured portion was not observed. Bubbles in the adhesive layer were not observed. Observation of bubbles was performed by visualizing with an ultrasonic flaw detector imaging apparatus HA-701 produced by Honda Electronics Co., Ltd.

EXAMPLE 2

Two disc substrates for a DVD were prepared by forming an Al film having a thickness of 80 nm on the surface of a polycarbonate substrate having an outer diameter of 120 mm and an inner diameter of 36 mm, and a cationic ultraviolet curable composition was distributed in a ring form on one disc substrate, using the apparatus shown in FIG. 1 in the same manner as in Example 1. The discharge pressure from the dispenser 1 was adjusted so that the dropped quantity (distributed quantity) of the ultraviolet curable composition was about 0.8 g. The dropped position was a 65 mm diameter position on the disc substrate 4. This was selected so as to be suitable for spreading the cationic ultraviolet curable composition over the whole face between the two disc substrates 4, when the cationic ultraviolet curable composition was spread by a spin coat method in a later stage.

After dropping the cationic ultraviolet curable composition in a ring form, another disc substrate was superposed thereon so that the adhesion face of the disc substrate faced the distributed face of the ring form cationic ultraviolet curable composition. After superposition, then by rotating the table at a speed of 4000 min_for 3 seconds, the cationic ultraviolet curable composition was spread between the two disc substrates.

Figure 5:
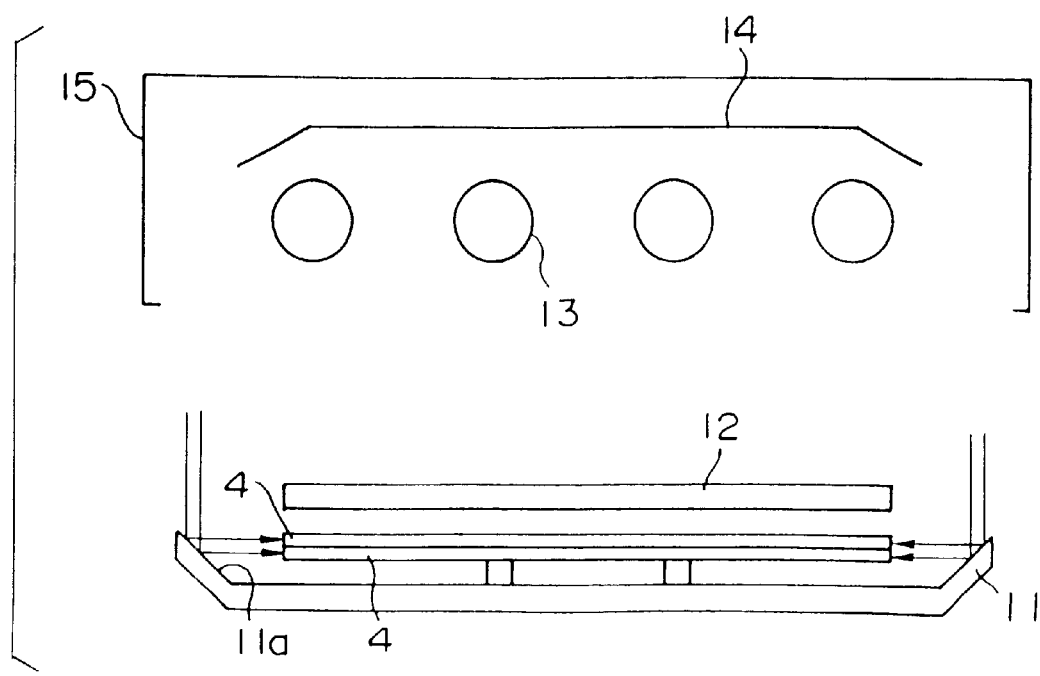
FIG. 5 is a schematic structural diagram showing an apparatus used for irradiating ultraviolet rays onto the edge face of an optical disc.

Thereafter, in order to promote curing of the edge faces of the disc which became one disc by lamination, in the same manner as in Example 1, the disc substrates 4 were mounted on a tray 11 as shown in FIG. 5, on which a reflective film 11a for reflecting ultraviolet rays was arranged with a shield plate 12 arranged thereabove and ultraviolet rays were irradiated in flashes. The ultraviolet rays were irradiated, as shown in FIG. 5, by an ultraviolet irradiation device comprising; cylindrical oblong xenon flash lamps 13 (FQ-20003 type produced by Ushio Inc.) having a tube diameter of 10.5 mm, and an effective arc length of about 200 mm, a reflector plate 14, and a case 15 for housing these. As for the irradiation conditions, the capacity C and inductance L of a capacitor in a discharge circuit (not shown) were adjusted so that the pulse width of a discharge current became 650 micro seconds, and a charging voltage was adjusted so that the lamp input energy became 200 J per one lamp, and ultraviolet rays were irradiated in 10 shots at a repetition speed of 5 times/second. In addition, the distance between the xenon flash lamp 13 and the disc substrates 4 was 40 mm.

After flash irradiation of ultraviolet rays as described above, the curing state of the cationic ultraviolet curable composition was observed, and it was found that the tacky state at the edge face portion of the disc observed in Example 1 had practically disappeared immediately after flash irradiation.

Moreover, after elapse of 10 minutes from completion of the spin coat method, the cationic ultraviolet curable composition between the disc substrates was gelled, and was not easily peeled.

After 20 minutes, when the two disc substrates were forcibly peeled to observe the curing and bonding state of the cationic ultraviolet curable composition, the whole face was uniformly cured, and any uncured portion was not observed. When the number of bubbles having a diameter of from 0.1 to 2.0 mm in the adhesive layer was counted, the number was $0.05/cm^2$. Bubbles over 2.0 mm diameter were not observed. Observation of bubbles was performed by visualizing with an ultrasonic flaw detector imaging apparatus HA-701 produced by Honda Electronics Co., Ltd.

As described above in detail, according to the present invention, since the cationic ultraviolet curable composition was irradiated with ultraviolet rays before being distributed on the disc substrate, and was then distributed and spread on the disc substrate, trapping of air can be suppressed, and an optical disc having no curing unevenness can be obtained. That is to say, if ultraviolet rays are irradiated while the ultraviolet curable composition is dropping from the nozzle to the disc substrate, ultraviolet rays can be irradiated uniformly into the interior of the cationic ultraviolet curable composition. Hence curing unevenness does not occur in the method of distributing the cationic ultraviolet curable composition on the disc substrate in a ring form. At this time, by covering the tip of the nozzle aperture with an ultraviolet irradiation prevention cover, ultraviolet rays are prevented from being irradiated to the nozzle aperture. Therefore, a decrease in the dropped quantity (distributed quantity) of the cationic ultraviolet curable composition due to curing thereof at the nozzle aperture, and the occurrence of complications such as blocking of the nozzle aperture and the like can be prevented.

Moreover, according to the present invention, bonding can be performed without directly irradiating ultraviolet rays onto the main face of the disc substrate. Hence deformation of the optical disc due to heat can be avoided.

Furthermore, according to the present invention, by irradiating ultraviolet rays onto the edge face of the laminated discs, the cationic ultraviolet curable composition in the vicinity of the edge face of the disc can be effectively cured. By performing the ultraviolet irradiation in flashes, the used power can be reduced.

Next is a specific description of the composition of the present invention by means of another example different from the above described examples.

After mixing and dissolving a cationic curable compound according to the mixing composition shown in Table 1 at 85° C. for 4 hours, a cationic photoinitiator and a leveling agent were mixed therewith and dissolved at 60° C. for 4 hours, to thereby prepare the ultraviolet curable compositions of Examples 3 to 6. The obtained compositions were examined to measure the initial viscosity and complex viscosity increase rate as described above. The results are shown together in Table 1. By changing the mixing composition, a cationic ultraviolet curable composition having a different complex viscosity increase rate could be obtained, even if the initial viscosity was the same.

TABLE 1

|  | Examples | | | |
| --- | --- | --- | --- | --- |
|  | 1 | 2 | 3 | 4 |
| Mixing composition (parts by weight) | | | | |
| Cationic curable compound | | | | |
| Epiclon 1050[1] | 20 | 15 | 10 | 5 |
| Hydrogenated bisphenol A diglycidyl ether[2] | — | 17.5 | 35 | 52.5 |
| 16H-DGE low chlorine product[3] | 80 | 67.5 | 55 | 42.5 |
| Cationic photoinitiator | | | | |
| RHODORSIL PHOTOINITIATOR 2074[4] | 0.5 | 0.5 | 0.5 | 0.5 |

TABLE 1-continued

|  | Examples | | | |
| --- | --- | --- | --- | --- |
|  | 1 | 2 | 3 | 4 |
| Leveling agent |  |  |  |  |
| L-7604[5] | 0.2 | 0.2 | 0.2 | 0.2 |
| Initial viscosity (mPa · s) | 300 | 300 | 300 | 300 |
| Complex viscosity increase rate (%) | 44 | 47 | 98 | 137 |

Note:
[1] solid form bisphenol A type diglycidyl ether, produced by Dainippon Ink and Chemicals, Inc.
[2] obtained by hydrogenating Epiclon 850S (produced by Dainippon Ink and Chemicals, Inc.) at a hydrogen pressure of 40 kg/cm$^2$, and at a temperature of 40° C. for 7 hours, in the presence of ruthenium catalyst.
[3] 1,6-hexanedioldiglycidyl ether, produced by Sakamoto Yakuhin Kogyo Co., Ltd.
[4] produced by Rhodia Co.
[5] produced by Nippon Unicar Co., Ltd.

Then, by variously changing the mixing compositions of the cationic curable compound, the cationic photoinitiator, and the leveling agent shown in Table 1, cationic ultraviolet curable compositions having the initial viscosities and the complex viscosity increase ratios shown in Table 2 were prepared. These compositions all had a chlorine content of less than 1% by weight. By using these compositions, two disc substrates were laminated. The used disc substrates were disc substrates for DVDs prepared by forming an Al film having a thickness of 80 nm on the surface of a polycarbonate substrate having an outer diameter of 120 mm and an inner diameter of 15 mm.

Figure 6:
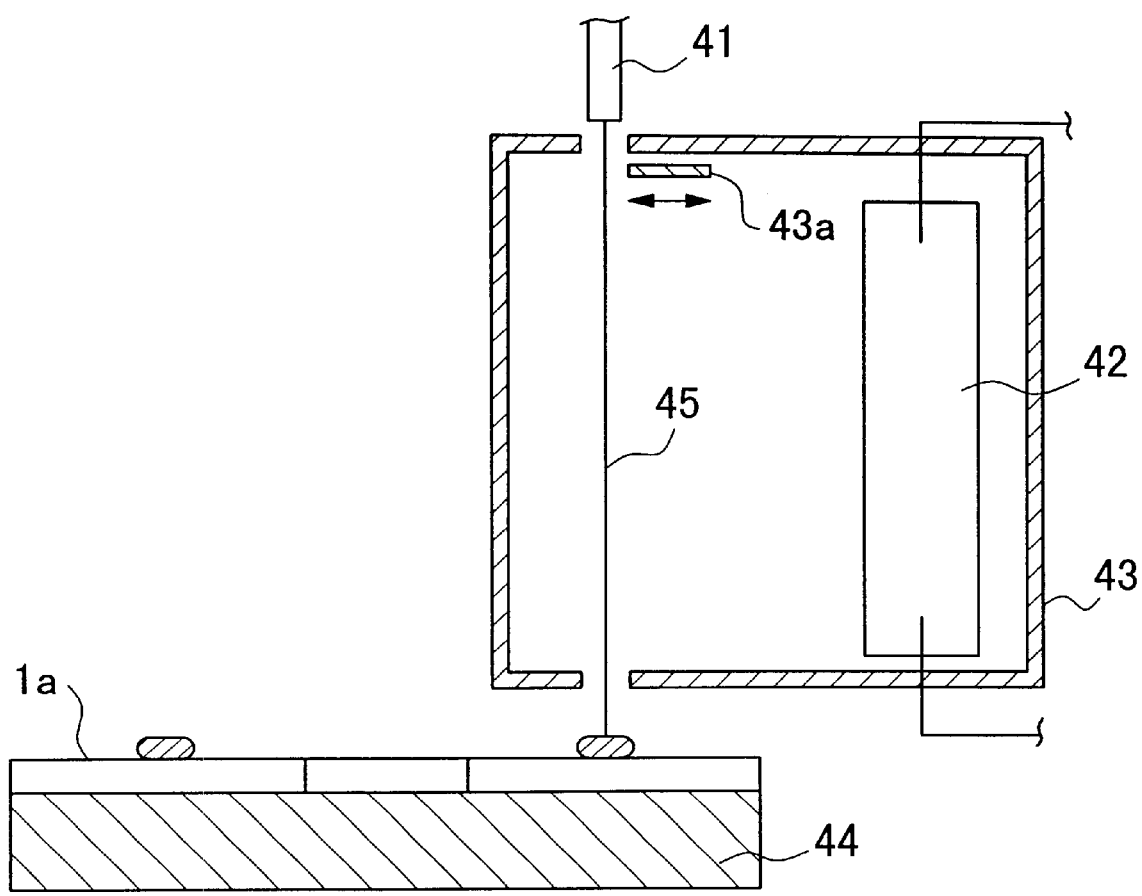
FIG. 6 is a diagram showing the construction of a dropping and irradiating apparatus for a cationic ultraviolet curable composition.

The distribution of the cationic ultraviolet curable composition onto the disc substrate was performed by using an application apparatus having the structure shown in FIG. 6.

In FIG. 6, reference numeral 41 denotes a dispenser (nozzle) for dropping the cationic ultraviolet curable composition, 42 denotes an ultraviolet irradiation device, 43 denotes a case having a reflector on the inside thereof, and 44 denotes a disc substrate mounting table.

As the dispenser 41, a model 1500DV (nozzle inner diameter of 0.83 mm) produced by EFD Co. in the U.S.A. can be used. As the ultraviolet irradiation device 42, an ultraviolet irradiation apparatus I250 type, D valve (arc length: 25 cm) produced by Fusion UV Systems, Inc., can be used. Moreover, the disc substrate mounting table 44 can be rotated by a motor (not shown). The distance between the ultraviolet irradiation device 42 and the cationic ultraviolet curable composition which is dropped was 50 mm. Moreover, the case 43 was provided with a shutter 43a movable in the direction of the arrow in the figure.

While the cationic ultraviolet curable composition 45 is dropping, ultraviolet rays are irradiated onto the cationic ultraviolet curable composition by making the ultraviolet irradiation device 42 emit light. During this period, the disc substrate mounting table 44 is rotated. Hence the cationic ultraviolet curable composition 45 is distributed on a first disc substrate 1a in a ring form. After a predetermined quantity of the cationic ultraviolet curable composition has been dropped, by operating the shutter 43a towards the left in the figure, an aperture through which the cationic ultraviolet curable composition passes is closed. Then, if another first disc substrate 1a has been moved into place for the next dropping of the cationic ultraviolet curable composition, the shutter 43a is operated to the condition shown in the figure to restart dropping of the cationic ultraviolet curable composition. If opening/closing of the shutter 43a is performed in this manner, even if the ultraviolet irradiation device 42 is emitting light while the cationic ultraviolet curable composition is not dropped, ultraviolet irradiation to the dispenser 41 can be prevented, and hence blocking thereof can be prevented.

As the dispenser, the above described model 1500DV (nozzle inner diameter of 0.83 mm) produced by EFD Co. in the U.S.A. was used to drop and distribute the cationic ultraviolet curable composition in a ring form so that the distributed quantity became 0.4 g. As the ultraviolet irradiation device 42, the ultraviolet irradiation apparatus I250 type, D valve (arc length: 25 cm) produced by Fusion UV Systems, Inc., was used to irradiate ultraviolet rays at an output of 70% of the maximum output. After distribution, a disc substrate on which the cationic ultraviolet curable composition was not distributed was superposed thereon by using a superposition apparatus having a structure shown in FIG. 7, to thereby obtain one disc. The disc was left alone without applying any load, to thereby spread the cationic ultraviolet curable composition. The property of the cationic ultraviolet curable composition, the edge face protrusion thereof, and the superiority or inferiority of the spreading during these sequential steps were observed.

One example of the superposition apparatus is shown in FIG. 7. The superposition apparatus 5 comprises a pair of disc substrate holding tables 51 and 52, a hinge 53 for connecting these tables 51 and 52, and suction passages 54 connected to a vacuum pump (not shown).

Figure 7A:
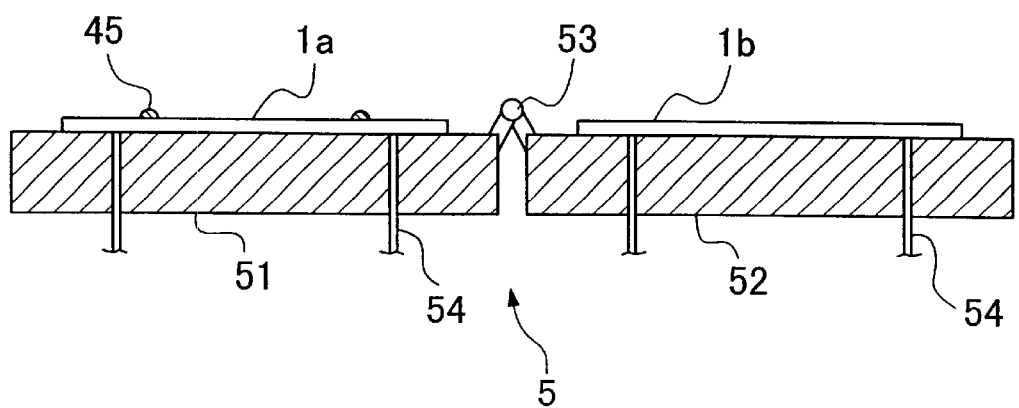
FIG. 7 is a diagram showing one example of a lamination apparatus.
Figure 7B:
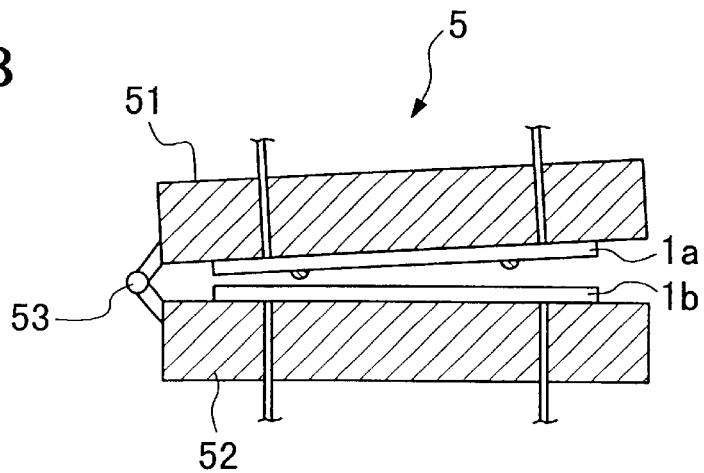

As shown in FIG. 7A, the first disc substrate 1a on which the cationic ultraviolet curable composition 45 has been distributed in a ring form is mounted on the disc substrate holding table 51, and a second disc substrate 1b is mounted on the disc substrate holding table 52. By driving the vacuum pump (not shown), the first and second disc substrates 1a and 1b are suction attached via the suction passages 54 onto the respective disc substrate holding tables 51 and 52. Then, from the state shown in FIG. 7A, the disc substrate holding table 51 is turned at a high speed about the hinge 53. When the disc substrate holding table 51 approaches the disc substrate holding table 52 up to the state shown in FIG. 7B, the turning speed is decreased, and thereafter, the turning speed is controlled so that the both discs approach each other at a speed in the order of micron per second. Then, when the space between the first disc substrate 1a and the second disc substrate 1b becomes an expected value, the approach is stopped, and drive of the vacuum pump is stopped.

If the disc is left alone after superposition, the cationic ultraviolet curable composition which has been in a ring form is spread by the inherent weight of the upper located disc substrate, or by pressing with a suitable load, and spreads over the whole face of the disc substrate. The thickness distribution of the adhesive layer between the discs thus laminated has a feature that the thickness is a maximum at a radial position distributed in a ring form, and decreases regularly toward the inner peripheral side and the outer peripheral side. On the other hand, the thickness of the adhesive layer in the case where the discs are laminated by the spin coat method has a feature that this is thinnest at the inner peripheral position, and increases regularly toward the outer periphery side. In the process of spreading, if deformation or displacement occurs, even if it is tried to correct the deformation or displacement forcibly, this becomes a very difficult operation. Therefore, it is desirable to perform the spreading step on a stationary flat surface. That is to say, by performing the spreading step on a flat surface where vibration or shaking is eliminated, deformation or displacement after completion of spreading can be suppressed to a minimum. As a result, a tilt occurring in the disc after curing can be suppressed.

With DVDs, there is a type having a protrusion in a ring form (a ring-shaped protrusion) formed on the outer periphery of the clamping area. Since this protrusion exists on the outer face of the DVD, if the DVDs are superposed, the upper and lower ring-shaped protrusions are brought into contact with each other. Hence the disc faces cannot be brought into contact with each other. Therefore, while superposing DVDs and spreading the ultraviolet curable composition, a DVD having a low rigidity will be deformed due to its own weight, and further due to the weight of the DVD superposed thereon, into an umbrella shape, that is, warping occurs.

With DVDs, there is a type having no protruding ring formed thereon, and in that case, no deformation occurs due to the existence of the protruding ring. However, as the number of superposed DVDs increases, minute deformations are accumulated, and there is a possibility that the deformation of DVD located on the upper layer of the superposition cannot be ignored from the viewpoint of product specifications.

Therefore, it is effective to interpose a rigid body disc having a flat face between the superposed discs. When the target is a DVD having no protruding ring formed thereon, the rigid body disc may have a simple flat face. However, when the protruding ring is formed on the DVD, it is necessary to consider a shape where the rigid body disc does not interfere with the protruding ring, for example to consider forming a ring-shaped groove in the portion corresponding to the ring-shaped protrusion. Moreover, the flatness of the flat face is not particularly limited, so far as the warp is within a predetermined value, and can be determined by way of experiments according to the conditions for spreading. Furthermore, it is not necessary for the flat face to be a continuous flat surface over the whole surface, and this may be an intermittent flat surface so long as the expected purpose can be achieved. For example, ring-shaped members having different diameters may be distributed coaxially, and the flat face of the present invention is a concept including such a construction.

The material of the rigid body disc is not particularly limited so long as the purpose can be achieved. However, with a production line, it can be assumed that the superposed DVDs are also transported to another place. Therefore it is desirable that the DVD is lightweight for the convenience of transportation. However, in general, since the smaller the specific gravity, the lower the rigidity, an appropriate thickness becomes necessary for achieving the purpose as the rigid body disc. For example, polycarbonate of the same quality as the DVD disc substrate can be used. In this case, it is necessary to determine the thickness so that there is sufficient rigidity. As the rigid body disc, a metal material can be used, and in this case, aluminum and titanium having a low specific gravity are preferable.

Figure 8:
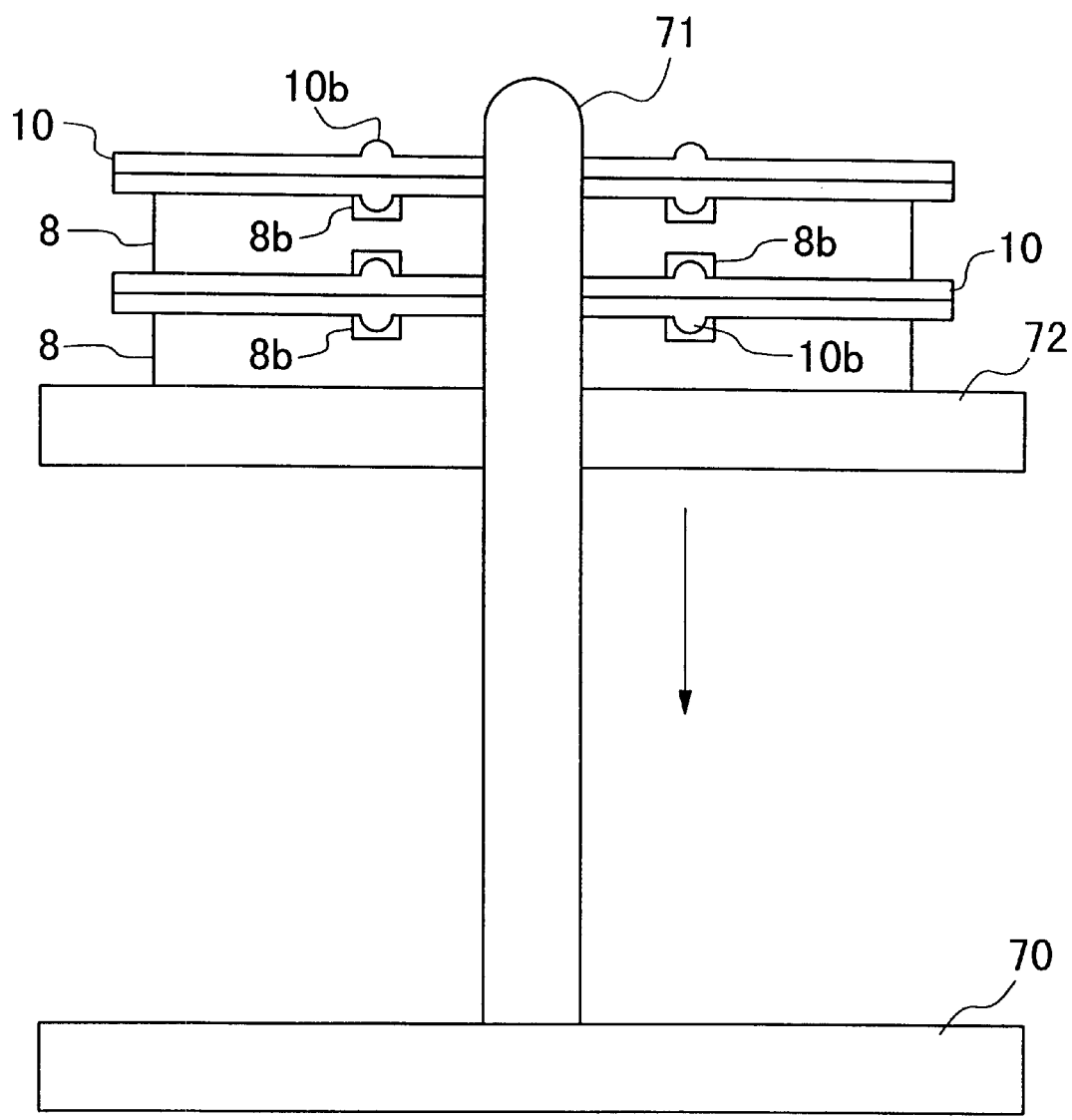
FIG. 8 is a diagram showing a state in the execution of a spreading step for laminating a disc and a rigid body disc.

One example of the spreading step by means of superposition is shown in FIG. 8. In FIG. 8, reference numeral 70 denotes a base, 71 denotes a spindle arranged in an upright condition on the base 70, and 72 denotes an elevator platform which moves up and down along the spindle 71. A disc 10 (comprising the aforesaid disc substrates 1a and 1b) which is transported first is mounted on the rigid body disc 8 which has been previously arranged on the elevator platform 70. At this stage, the cationic ultraviolet curable composition has not been spread over the whole face between the two disc substrates. Then, after lowering the elevator 72 until the tip of the spindle protrudes from the disc 10, the next rigid body disc 8 is mounted on the disc 10. Then, after lowering the elevator 72 in the same manner, the next transported disc 10 is mounted. After superposing a predetermined number of discs 10 in this manner, they are left alone until a predetermined period of time has passed. During this period, the cationic ultraviolet curable composition spreads over the whole face between the two disc substrates, thus completing the spreading processing.

On the rigid body disc 8, there is formed a ring-shaped groove 8b for avoiding interference with the ring-shaped protrusion 10b on the disc 10. The outer diameter of the rigid body disc 8 is set to be smaller than the outer diameter of the disc 10. This is because sometimes a burr occurs on the outer peripheral edge portion of the disc substrate constituting the disc 10, attributable to the protrusion molding, and this avoids interference between the burr and the rigid body disc 8.

Figure 9:
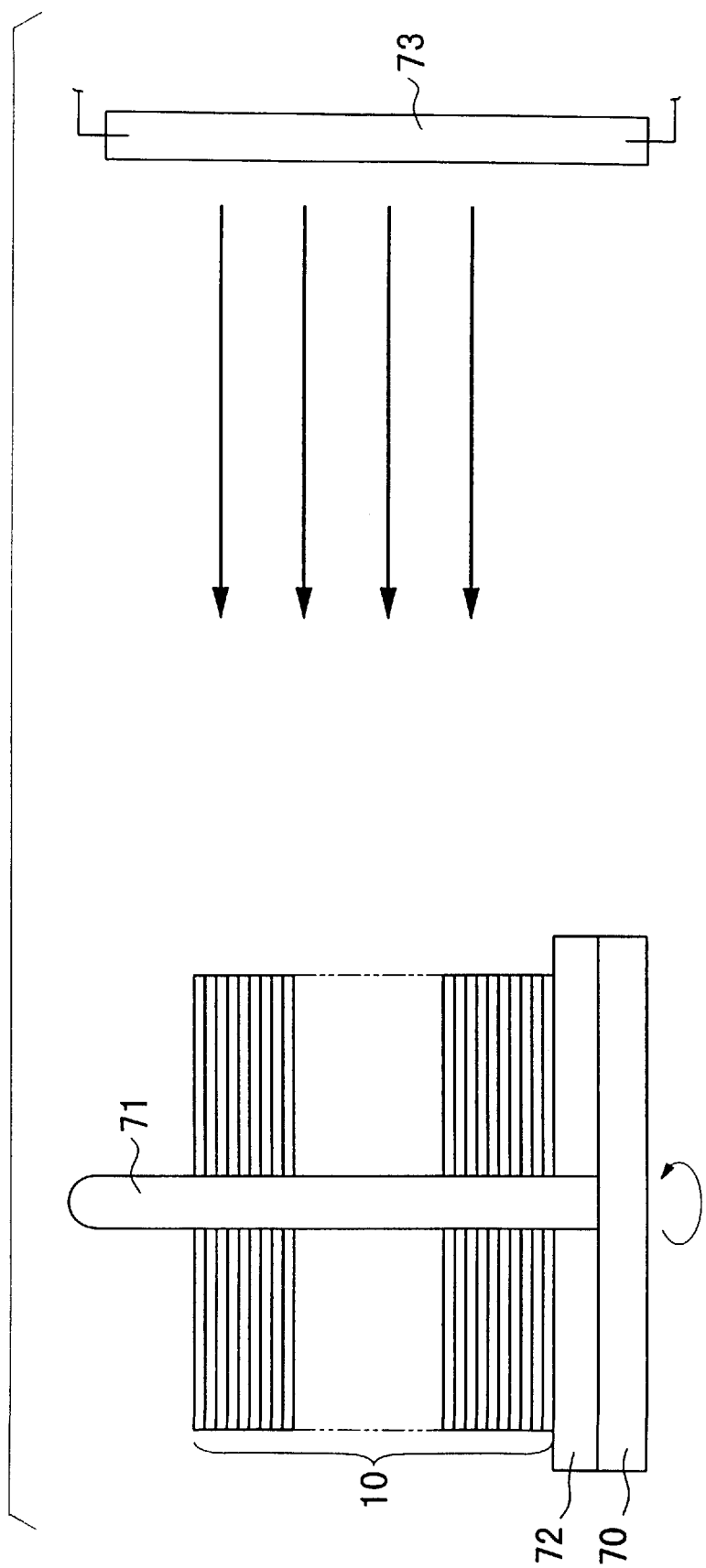
FIG. 9 is a diagram showing a state in the execution of heating processing while the discs are superposed.

FIG. 9 shows one example of the above. That is to say, after completion of the spreading processing, the discs 10 are heated in the superposed state using a heating device, for example a halogen heater 73, while rotating the discs 10.

In addition to the method of irradiating ultraviolet rays, there is also a method of heating the discs to a predetermined temperature in this manner. This heating technique is effective for reducing the production cost, since it can be done with lower cost equipment than the equipment required for ultraviolet irradiation. As for the heating temperature, it is necessary to properly determine this according to the material constituting the disc substrate, and the cationic ultraviolet curable composition. In the case of DVDs however, since if the temperature exceeds 70° C. there is a possibility of deformation occurring in the disc substrate due to thermal stresses, it is preferable to set the temperature to below 70° C. Moreover, to promote curing of the cationic ultraviolet curable composition, it is desirable to set the heating temperature to above 40° C.

After the spreading, the discs were left alone for 5 minutes at a temperature of 24° C., and thereafter as shown in FIG. 9, edge face treatment was performed with the halogen heater 73. As the halogen heater 73, a low cost halogen heater unit with a gold mirror having good heat wave reflection efficiency (IHU-H01-00 type produced by Ushio Inc.) was used. The heating conditions were such that the halogen heater 73 was switched on at a voltage of AC 100V, the distance from the disc 10 was 500 mm, and the spindle 71 was rotated at a speed of 2 rotations/second while the heater was on. Then, after 5 minutes, the spreading state, the thickness, and the warping of the disc adhesive layer was evaluated.

Figure 10A:
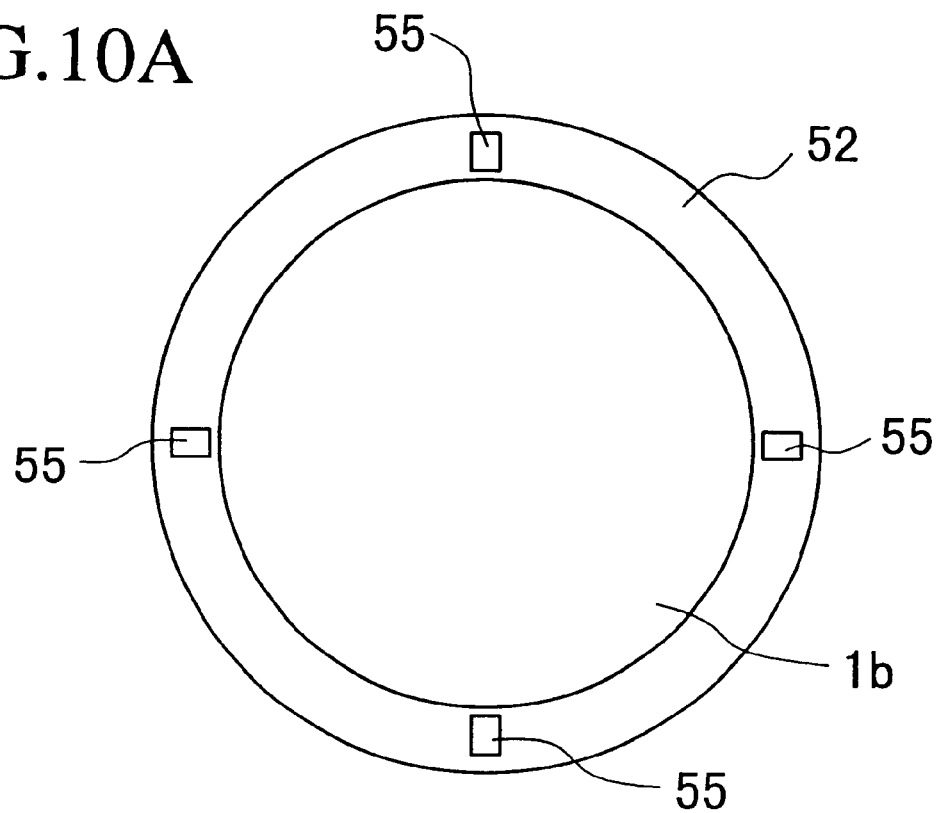
FIG. 10 is a diagram showing a method for pressing when the discs are superposed.
Figure 10B:
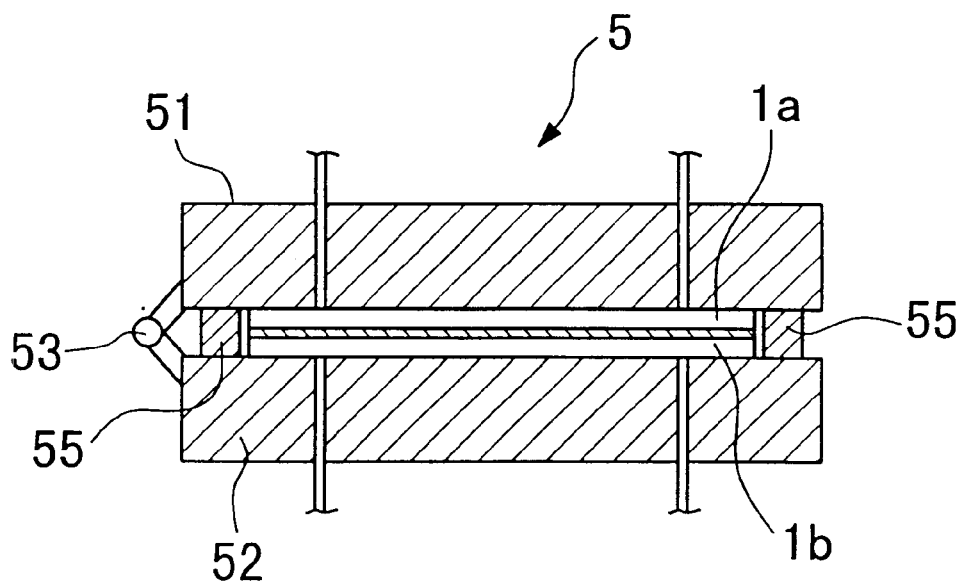

The results are shown in Table 2. Moreover, when the discs are superposed, then as shown in FIG. 10, four spacers 55 having a thickness of 1.205 mm are interposed in a cross shape between the disc holding substrates 51 and 52. The evaluation results for when the disc holding substrates 51 and 52 are pressed forcibly until they come into contact with each other via the spacers, are shown in Table 3. In the case of this forcible pressing, the distributed quantity of the adhesive is adjusted so that the tip of the spread adhesive after pressing comes into a range of from 5 to 8 mm on both the inner and outer peripheral sides of the disc. FIG. 10A is a plan view showing the arrangement of the spacers 55, and FIG. 10B is a side sectional view. Moreover, in Tables 2 and 3, "protrusion" means that the cationic ultraviolet curable composition partially protrudes from the laminated edge faces of the discs in a grainy form, "poor application" means that immediately after being distributed in a ring form, the cationic ultraviolet curable composition spreads and cannot maintain a uniform shape until superposition, and "poor spreading" means that the adhesive does not spread over the whole face between the discs, and is lacking at the inner and outer peripheral portions. Moreover, "uneven thickness" while not "poor spreading", means that since the adhesive has not been sufficiently distributed to fill in the space at the inner and outer peripheral portions of the discs, the thickness of the adhesive layer after being cured becomes extremely thin at the inner and outer peripheral portions of the discs. In this case, the main point is that when the thickness of the adhesive at the inner and outer peripheral tip edge portions is less than 5 μm, this is defined as "uneven thickness". Furthermore, "worse warping" means that the radial tilt exceeds 0.7°, or the tangential tilt exceeds 0.30. Evaluation of "protrusion", "poor application", "poor spreading", "uneven thickness" and "worse warping" specified here shows only the trend through the sequential experiments, and does not show there is a strict boundary between these evaluations. In addition, observation of bubbles in the discs obtained in the Examples was performed by visualizing with an ultrasonic flaw detector imaging apparatus HA-701 produced by Honda Electronics Co., Ltd. In all of the optical discs, the number of bubbles was less than 1 per 1 cm. Moreover, bubbles exceeding 2.0 mm did not exist.

From the results shown in Table 2 and Table 3, it is seen that in the range where the initial viscosity is from 200 to 450 mPa·s and the complex viscosity increase rate is not higher than 200%, protrusion, poor application and poor spreading do not occur, and a disc having an even thickness and minimal warping after being cured can be obtained. Moreover, as seen from a comparison of Table 2 and Table 3, since the allowable complex coefficient of viscosity varies depending upon whether or not pressure is applied, this point should be considered when the composition is actually adjusted.

According to the present invention, a disc can be obtained where protrusion from the edge face after superposition, poor application and poor spreading of the cationic ultraviolet curable composition does not occur. Moreover, the thickness of the cationic ultraviolet curable composition after being cured is uniform, and there is minimal warping. Furthermore, since the cationic ultraviolet curable composition is irradiated in advance with ultraviolet rays and then spread on the disc substrate, lamination can be performed without directly irradiating ultraviolet rays onto the surface of the disc substrate. Hence, deformation of the disc substrate after lamination can be avoided. Therefore, an optical disc such as a DVD-RAM can be produced accurately and efficiently.

TABLE 2

| | | Initial viscosity (mPa · s) | | | | | | | | |
|---|---|---|---|---|---|---|---|---|---|---|
| | | 160 | 180 | 200 | 250 | 300 | 350 | 450 | 470 | 500 |
| Complex viscosity increase rate (%) | 10 | * | * | ○ | ○ | ○ | ○ | ○ | ■ | ■ |
| | 50 | * | * | ○ | ○ | ○ | ○ | ○ | ■ | ■ |
| | 100 | * | * | ○ | ○ | ○ | ○ | ○ | ■ | ■ |
| | 150 | * | * | ○ | ○ | ○ | ○ | ■ | ■ | ■ |
| | 180 | * | * | ○ | ○ | ○ | ■ | ■ | ■ | ■ |
| | 200 | ▲ | ▲ | ○ | ■ | ■ | ■ | ■ | ■ | ■ |
| | 220 | ▲ | ▲ | ■ | ■ | ■ | ■ | ■ | ■ | ■ |

*Protrusion or poor application,
■ Poor spreading,
▲ Uneven thickness or worse warping

TABLE 3

| | | Initial viscosity (mPa · s) | | | | | | | | |
|---|---|---|---|---|---|---|---|---|---|---|
| | | 160 | 180 | 200 | 250 | 300 | 350 | 450 | 470 | 500 |
| Complex viscosity increase rate (%) | 10 | * | * | ○ | ○ | ○ | ○ | ○ | ■ | ■ |
| | 50 | * | * | ○ | ○ | ○ | ○ | ○ | ■ | ■ |
| | 100 | * | * | ○ | ○ | ○ | ○ | ○ | ■ | ■ |
| | 150 | * | * | ○ | ○ | ○ | ○ | ○ | ■ | ■ |
| | 180 | * | * | ○ | ○ | ○ | ○ | ○ | ■ | ■ |
| | 200 | ▲ | ▲ | ○ | ○ | ○ | ○ | ○ | ■ | ■ |
| | 220 | ▲ | ▲ | ■ | ■ | ■ | ■ | ■ | ■ | ■ |

*Protrusion or poor application,
■ Poor spreading,
▲Uneven thickness or worse warping

What is claimed is:

1. An optical disc in which two disc substrates with at least one having an ultraviolet transmissive layer are laminated via an adhesive layer, the optical disc characterized in that said adhesive layer comprises a cured layer of a cationic ultraviolet curable composition that has been previously irradiated with ultraviolet light before superposing the discs, said disc further characterized in that the surface of said substrates has not been irradiated by ultraviolet light, and the number of bubbles contained in the adhesive layer is from 0 to 5 per 1 $cm^2$.

2. An optical disc according to claim 1, wherein the number of bubbles contained in the adhesive layer is from 0 to 5 per 1 $cm^2$, and the diameter of the bubbles is from 0.1 to 2.0 mm.

3. An optical disc according to claim 1, comprising: one disc substrate having at least a transparent resin layer, a recording layer, and an optical reflecting layer serving as an ultraviolet non-transmissive film layer; an adhesive layer; and another disc substrate comprising said disc substrate or a transparent resin substrate.

4. An optical disc according to claim 1 or claim 2, wherein said two disc substrates both have ultraviolet non-transmissive film layers.

5. An optical disc according to claim 4, wherein one of the ultraviolet non-transmissive film layers is an information recording layer.

6. A production method for an optical disc, wherein a cationic curable composition in a liquid form irradiated beforehand with ultraviolet rays is distributed on a first disc substrate, before superposing a second disc substrate thereon and spreading the cationic curable composition in a liquid form, and the second disc substrate is then superposed thereon to spread said cationic curable composition in a liquid form, and said cationic curable composition in a liquid form is allowed to cure.

7. A production method for an optical disc comprising the steps of: irradiating ultraviolet rays onto a cationic ultraviolet curable composition; dropping the cationic ultraviolet curable composition which has been irradiated with ultraviolet rays onto a first disc substrate; superposing a second disc substrate on the first disc substrate on which the cationic ultraviolet curable composition has been distributed; and spreading the cationic ultraviolet curable composition.

8. A production method for an optical disc according to claim 6, wherein the cationic ultraviolet curable composition dropping from a nozzle is irradiated with ultraviolet rays before reaching said first disc substrate.

9. A production method for an optical disc according to claim 8, wherein ultraviolet rays are irradiated from around the whole periphery of the dropping cationic ultraviolet curable composition.

10. A production method for an optical disc according to any one of claim 6 through claim 9, wherein after dropping the cationic ultraviolet curable composition which has been irradiated with ultraviolet rays onto the surface of at least one disc substrate in a ring form, the other disc substrate is superposed thereon to spread the cationic ultraviolet curable composition by pressing or by the weight of the other disc substrate itself.

11. A production method for an optical disc according to any one of claim 6 through claim 9, wherein the cationic ultraviolet curable composition in a liquid form is dropped with the ultraviolet irradiation shut off to the periphery of a nozzle tip.

12. A production method for an optical disc according to claim 6 or claim 7, wherein said cationic ultraviolet curable composition in a liquid form is such that curing can be initiated by the irradiation of ultraviolet rays, and the composition can be spread approximately between the two disc substrates by superposing the two disc substrates, after which the curing is completed.

13. A production method for an optical disc according to claim 6 or claim 7, wherein said cationic ultraviolet curable composition in a liquid form contains an epoxy resin as the main component and a cation polymerization type photoinitiator as an initiator.

14. A production method for an optical disc according to claim 6 or claim 7, wherein said cationic ultraviolet curable composition in a liquid form, is a cationic ultraviolet curable composition in a liquid form having a viscosity of from 200 to 450 mPa·s as measured by a BM type viscometer, and an increase rate of the complex coefficient of viscosity after 3 minutes from irradiation of ultraviolet rays of not higher than 200%.

15. A production method for an optical disc according to claim 6 or claim 7, wherein said cationic ultraviolet curable composition in a liquid form contains a bisphenol type epoxy resin and an aliphatic diol diglycidyl ether as the main component and a cation polymerization type photoinitiator as an initiator.

16. An intermediate for making an optical disc, said intermediate consisting essentially of:

a single disc substrate having a side; and a cationic ultraviolet curable composition previously irradiated with ultraviolet light and distributed on one side of said disc substrate.

* * * * *